United States Patent
Svendsen et al.

(10) Patent No.: US 8,122,142 B1
(45) Date of Patent: *Feb. 21, 2012

(54) OBTAINING AND DISPLAYING STATUS UPDATES FOR PRESENTATION DURING PLAYBACK OF A MEDIA CONTENT STREAM BASED ON PROXIMITY TO THE POINT OF CAPTURE

(75) Inventors: Hugh Svendsen, Chapel Hill, NC (US); John Forese, Atherton, CA (US); Steven L. Petersen, Los Gatos, CA (US)

(73) Assignee: Lemi Technology, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/902,767

(22) Filed: Oct. 12, 2010

(51) Int. Cl.
G06F 15/16 (2006.01)
(52) U.S. Cl. ...................................................... 709/231
(58) Field of Classification Search .................... 709/231
See application file for complete search history.

(56) References Cited

U.S. PATENT DOCUMENTS

| | | | |
|---|---|---|---|
| 6,625,656 B2 | 9/2003 | Goldhor et al. | |
| 6,948,131 B1* | 9/2005 | Neven et al. | 715/753 |
| 7,330,875 B1 | 2/2008 | Parasnis et al. | |
| 2004/0107270 A1* | 6/2004 | Stephens et al. | 709/219 |
| 2005/0210145 A1 | 9/2005 | Kim et al. | |
| 2005/0227218 A1* | 10/2005 | Mehta et al. | 434/350 |
| 2007/0250901 A1 | 10/2007 | McIntire et al. | |
| 2008/0209330 A1* | 8/2008 | Cruver | 715/733 |
| 2008/0216125 A1* | 9/2008 | Li et al. | 725/62 |
| 2008/0275881 A1* | 11/2008 | Conn et al. | 707/10 |
| 2008/0282286 A1 | 11/2008 | Or | |
| 2009/0087161 A1* | 4/2009 | Roberts et al. | 386/66 |
| 2010/0070501 A1* | 3/2010 | Walsh et al. | 707/736 |
| 2010/0070577 A1 | 3/2010 | Relyea et al. | |
| 2010/0180001 A1 | 7/2010 | Hardt | |
| 2010/0199188 A1 | 8/2010 | Abu-Hakima et al. | |
| 2010/0214419 A1* | 8/2010 | Kaheel et al. | 348/207.1 |

(Continued)

FOREIGN PATENT DOCUMENTS

WO 0139506 A2 5/2001

OTHER PUBLICATIONS

El-Saban et al.; "Stitching Videos Streamed by Mobile Phones in Real-time"; Oct. 24, 2009; Cairo Microsoft Innovation Lab, pp. 1009-1010.*

(Continued)

*Primary Examiner* — Jerry Dennison
(74) *Attorney, Agent, or Firm* — Withrow & Terranova, PLLC

(57) ABSTRACT

Systems and methods are provided for obtaining status updates relevant to a segment of a media content stream for presentation during playback. In general, a status updating service collects status updates sent by users via corresponding mobile devices of the users. A media playback device of a user receives a media content stream and obtains data defining a time of capture and, in some embodiments, a location of capture of a segment of the media content stream. Either prior to or during playback of the media content stream, the media playback device obtains status updates that are relevant to the segment of the media content stream directly or indirectly from the status updating service. The media playback device then presents the relevant status updates, or at least a subset thereof, during playback of the media content stream and preferably during playback of the segment of the media content stream.

17 Claims, 18 Drawing Sheets

U.S. PATENT DOCUMENTS

2010/0217837 A1    8/2010   Ansari et al.
2010/0281178 A1   11/2010   Sullivan
2010/0306402 A1*  12/2010   Russell et al. ............... 709/231
2010/0318571 A1*  12/2010   Pearlman et al. ............ 707/784

OTHER PUBLICATIONS

Newman, Jared, "Google's Realtime Search Update Does What Twitter Won't," PCWorld, Aug. 26, 2010, Retrieved from the internet: http://www.pcworld.com/article/204246/googles_realtime_search_update_does_what_twitter_wont.html.

Swedlow, Tracy, "Verizon Launches Twitter, Facebook, Fantasy Sports and Internet Video Widgets for FiOS TV," InteractiveTV Today, Jul. 15, 2009, Retrieved from the internet: http://www.itvt.com/story/5204/verizon-launches-twitter-facebook-fantasy-sports-and-internet-video-widgets-fios-tv.

* cited by examiner

OBTAINING AND DISPLAYING STATUS UPDATES FOR PRESENTATION DURING PLAYBACK OF A MEDIA CONTENT STREAM BASED ON PROXIMITY TO THE POINT OF CAPTURE

FIELD OF THE DISCLOSURE

The present disclosure relates to status updates sent by users and more specifically relates to obtaining and displaying relevant status updates for presentation during playback of a media content stream.

BACKGROUND

Status updating services, such as the Twitter® micro-blogging and social networking service, are becoming prolific in today's society. Oftentimes, users provide such status updates while being present at live events such as, for example, sporting events. There is a need for a system and method that leverages such status updates to provide an improved media playback experience for live or pre-recorded events.

SUMMARY

Systems and methods are provided for obtaining status updates relevant to a segment of a media content stream for presentation during playback of the media content stream. In general, a status updating service collects status updates sent by users via corresponding mobile devices of the users. A media playback device of a user receives a media content stream and obtains data defining a time of capture and, in some embodiments, a location of capture of a segment of the media content. Either prior to or during playback of the media content stream, the media playback device obtains status updates that are relevant to the segment of the media content directly or indirectly from the status updating service. The media playback device then presents the relevant status updates, or at least a subset thereof, during playback of the media content and preferably during playback of the segment of the media content.

In one embodiment, the relevant status updates include status updates sent in temporal proximity to the time of capture of the segment of the media content stream from users in one or more crowds of users. In another embodiment, the relevant status updates include status updates sent in temporal proximity to the time of capture of the segment of the media content stream from users in one or more crowds of users located in proximity to the location of capture of the segment of the media content stream at the time of capture of the media content stream. In another embodiment, the relevant status updates include status updates sent in temporal proximity to the time of capture of the segment of the media content stream from users in one or more crowds of users located in proximity to the location of capture of the segment of the media content stream at the time of capture of the media content stream and that match a user profile of a user of the media playback device to a predefined threshold degree. In another embodiment, the relevant status updates include status updates sent in temporal proximity to the time of capture of the segment of the media content stream from users in one or more crowds of users that match a user profile of the user of the media playback device to at least a predefined threshold degree.

In another embodiment, the relevant status updates include status updates sent in temporal proximity to the time of capture of the segment of the media content stream from users located in proximity to the location of capture of the segment of the media content stream at the time of capture of the segment of the media content stream. In another embodiment, the relevant status updates include status updates sent in temporal proximity to the time of capture of the segment of the media content stream from users located in proximity to the location of capture of the segment of the media content stream at the time of capture of the segment of the media content stream and that have user profiles that match a user profile of a user of the media playback device to at least a predefined threshold degree.

In another embodiment, a computer-readable medium stores software for instructing a controller of a media playback device to receive a media content stream, obtain a time of capture and a location of capture of a segment of the media content stream, obtain one or more relevant status updates comprising one or more status updates sent in temporal proximity to the time of capture of the segment of the media content stream by users located in proximity to the location of capture of the segment of the media content stream at the time of capture of the segment of the media content stream, and effect presentation of the one or more relevant status updates during playback of the segment of the media content stream.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 8A and 8B illustrate a portion of an exemplary media content stream that is encoded with time of capture and location of capture data for a number of segments of the media content stream and is also encoded with anchors according to one embodiment of the present disclosure;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are provided for obtaining status updates relevant to a segment of a media content stream for presentation during playback of the media content stream. The media content stream may be delivered over a terrestrial or satellite broadcast network, an Internet connection, or a Local Area Network (LAN) connection. For example, the media content stream may be streaming video content for a live or pre-recorded event (e.g., a television broadcast of a live event such as a sporting event or a streaming Internet video broadcast of a live event such as a sporting event). As another example, the media content stream may be streaming audio content for a live or pre-recorded event (e.g., a radio broadcast of a live or pre-recorded sporting event or a streaming Internet audio broadcast of a live or pre-recorded sporting event). Also, as used herein, a status update is a message provided by a user as an indicator of a current status of the user. The status update may include text-based status updates, an audio status update, a video status update, an image status update, or any combination thereof. As an example, a status update may be a tweet provided by a user of the Twitter® micro-blogging and social networking service, which is referred to herein as one example of a status updating service.

Figure 1A:
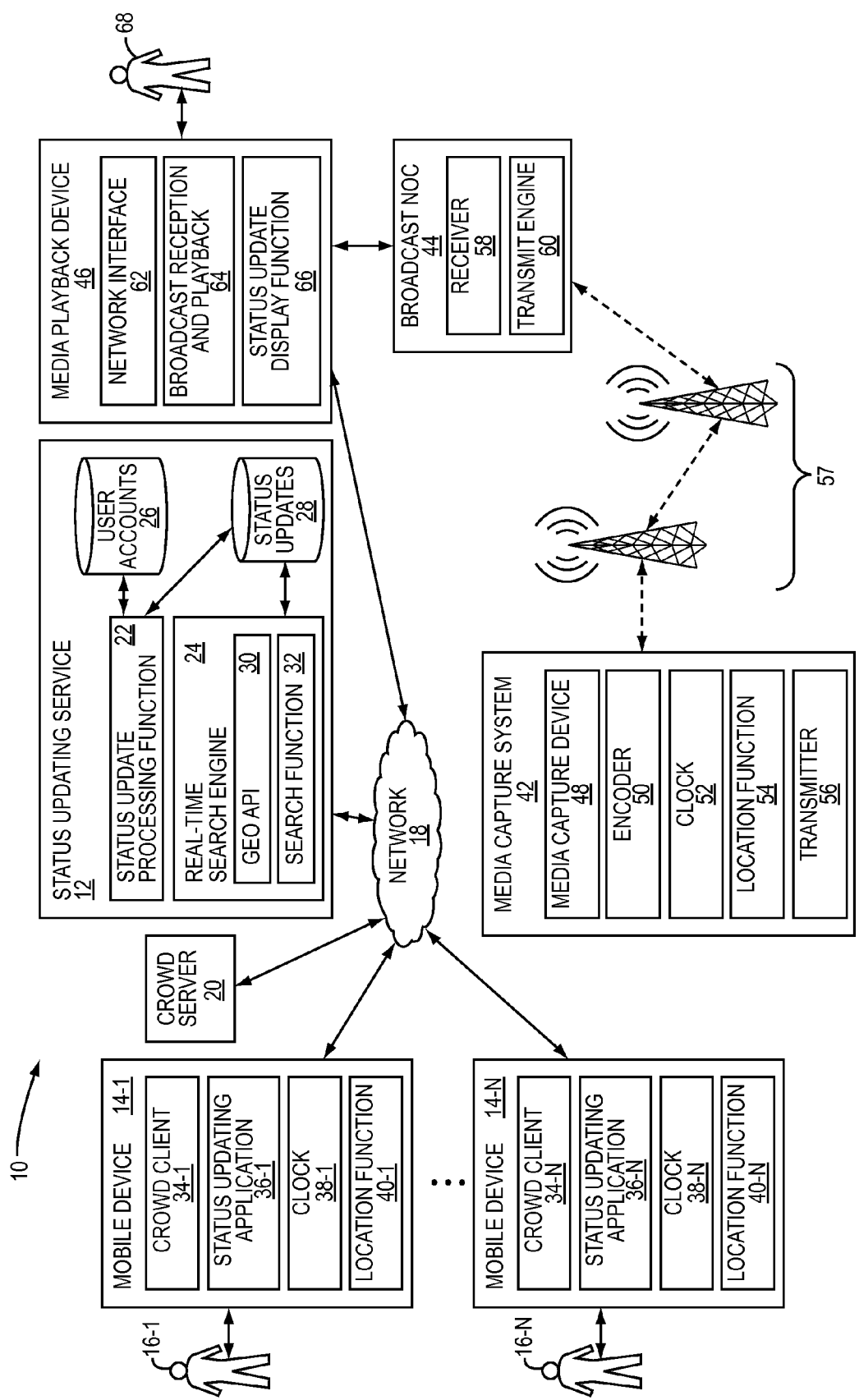
FIG. 1A illustrates a system for obtaining relevant status updates for a segment of a media content stream presenting the relevant status updates during playback of the media content stream and, preferably, during playback of the segment of the media content stream according to one embodiment of the present disclosure.

FIG. 1A illustrates a system 10 for obtaining status updates relevant to one or more segments of a media content stream for presentation during playback of the media content stream according to one embodiment of the present disclosure. As illustrated, the system 10 includes a status updating service 12 and a number of mobile devices 14-1 through 14-N having associated users 16-1 through 16-N, where the mobile devices 14-1 through 14-N are enabled to communicate with the status updating service 12 via a network 18. The mobile devices 14-1 through 14-N are also generally referred to herein collectively as mobile devices 14 and individually as mobile device 14. Likewise, the users 16-1 through 16-N are also generally referred to herein collectively as users 16 and individually as user 16. The network 18 is preferably a distributed public network such as the Internet. However, the present disclosure is not limited thereto. Specifically, the network 18 may be any type of Wide Area Network (WAN) or LAN or any combination thereof. Further, the network 18 may include wired components, wireless components, or both wired and wireless components. In some embodiments, the system 10 also includes a crowd server 20.

The status updating service 12 is preferably implemented in software and hosted by a physical server or a number of physical servers operating in a collaborative manner for purposes of load sharing or redundancy. In this embodiment, the status updating service 12 includes a status update processing function 22, a real-time search engine 24, a user accounts repository 26, and a status updates repository 28. The status update processing function 22 operates to enable users, such as the users 16-1 through 16-N, to register with the status updating service 12. In response, corresponding user accounts are created in the user accounts repository 26. In this embodiment, the user accounts repository 26 includes a user account for each of the users 16. The user account of each of the users 16 may include a user identifier (ID) of the user 16 such as a screen name or username of the user 16 for the status updating service 12 and, in some embodiments, an indicator such as a flag that indicates whether status updates from the user 16 are to be shared with the crowd server 20. In some embodiments, the user account of the user 16 may also include a user profile of the user 16 that defines one or more interests of the user 16.

As discussed below in detail, the status update processing function 22 also operates to receive status updates from the users 16 via the mobile devices 14 of the users 16 over the network 18. Each status update preferably includes the user ID of the user 16 from which the status update originated, a body of the status update, a timestamp defining a time and date on which the status update was sent from the mobile device 14 of the user 16 to the status updating service 12, and, in some embodiments, a location of the user 16 at the time the status update was sent from the mobile device 14 to the status updating service 12. Upon receiving status updates from the mobile devices 14 of the users 16, the status update processing function 22 stores the status updates in the status updates repository 28. In some embodiments, the status update processing function 22 also operates to send the status updates, or the status updates from some of the users 16, to the crowd server 20 either as they are received or in a batch process. The real-time search engine 24 generally enables third parties and, in some embodiments, the users 16 to access status updates from the status updates repository 28. In this embodiment, the real-time search engine 24 includes a Geographic Searching Application Programming Interface (GEO API) 30 and a search function 32 that operate together to enable geographic based searching of the status updates stored in the status updates repository 28.

The mobile devices 14 are portable devices having network capabilities. For example, each of the mobile devices 14 may be a mobile smart phone (e.g., an Apple® iPhone® device, a smart phone using the Google® Android™ Operating System such as the Motorola® Droid phone, or the like), a portable media player or gaming device having network capabilities (e.g., an Apple® iPod Touch® device), a tablet computer (e.g., an Apple® iPad® device), a notebook or laptop computer, or the like. In this embodiment, the mobile devices 14-1 through 14-N include crowd clients 34-1 through 34-N (also generally referred to herein collectively as crowd clients 34 and individually as crowd client 34), status updating applications 36-1 through 36-N (also generally referred to herein collectively as status updating applications 36 and individually as status updating application 36), clocks 38-1 through 38-N (also generally referred to herein collectively as clocks 38 and individually as clock 38), and location functions 40-1 through 40-N (also generally referred to herein collectively as location functions 40 and individually as location function 40), respectively.

The crowd client 34 is preferably, but not necessarily, implemented in software and generally operates to provide location updates for the user 16 of the mobile device 14 to the crowd server 20. The location updates received from the mobile devices 14 of the users 16 are used by the crowd server 20 to form and track crowds of users. The crowd client 34 may provide additional features such as, for example, querying the crowd server 20 for information regarding crowds of users and presenting the resulting information received from the crowd server 20 to the user 16. While not essential for the present disclosure, the interested reader may find additional information regarding features that may additionally be provided by the crowd client 34 and the crowd server 20 in U.S. patent application Ser. No. 12/645,532, entitled FORMING CROWDS AND PROVIDING ACCESS TO CROWD DATA IN A MOBILE ENVIRONMENT, which was filed Dec. 23, 2009; U.S. patent application Ser. No. 12/645,539, entitled ANONYMOUS CROWD TRACKING, which was filed Dec. 23, 2009; U.S. patent application Ser. No. 12/645,535, entitled MAINTAINING A HISTORICAL RECORD OF ANONYMIZED USER PROFILE DATA BY LOCATION FOR USERS IN A MOBILE ENVIRONMENT, which was filed Dec. 23, 2009; U.S. patent application Ser. No. 12/645,546, entitled CROWD FORMATION FOR MOBILE DEVICE USERS, which was filed Dec. 23, 2009; U.S. patent application Ser. No. 12/645,556, entitled SERVING A REQUEST FOR DATA FROM A HISTORICAL RECORD OF ANONYMIZED USER PROFILE DATA IN A MOBILE ENVIRONMENT, which was filed Dec. 23, 2009; U.S. patent application Ser. No. 12/645,560, entitled HANDLING CROWD REQUESTS FOR LARGE GEOGRAPHIC AREAS, which was filed Dec. 23, 2009; and U.S. patent application Ser. No. 12/645,544, entitled MODIFYING A USER'S CONTRIBUTION TO AN AGGREGATE PROFILE BASED ON TIME BETWEEN LOCATION UPDATES AND EXTERNAL EVENTS, which was filed Dec. 23, 2009; all of which are commonly owned and assigned and are hereby incorporated herein by reference in their entireties.

The status updating application 36 is also preferably, but not necessarily, implemented in software. For example, if the mobile device 14 is an Apple® iPhone® device, the status updating application 36 may be an iPhone® application. The status updating application 36 enables the user 16 to submit status updates to the status updating service 12. For example, the status updating application 36 may enable the user 16 to create text messages and submit the text messages as status updates to the status updating service 12. As a specific example, the status updating service 12 may be the Twitter® micro-blogging and social networking service, and the status updating application 36 may be a Twitter® client application that enables the user 16 to create and submit tweets to the Twitter® micro-blogging and social networking service. However, while Twitter® is provided as an example, the present disclosure is not limited thereto. Other types of status updating services 12, whether they are stand-alone services or services that are incorporated into larger services, may be used.

Each status update sent by the status updating application 36 for the user 16 is tagged or otherwise associated with a timestamp that defines the time and date that the status update was sent by the status updating application 36. Further, in some embodiments, each status update is also tagged with a geographic location (hereinafter "location") of the mobile device 14, and thus the user 16, at the time that the status update was sent by the status updating application 36. The status updating application 36 obtains the timestamps for the status updates sent for the user 16 from the clock 38. The clock 38 may be implemented in software, hardware, or a combination thereof and operates to provide the current time of day and date. In one embodiment, the clock 38 is a network-assisted clock to ensure synchronization between the clock 38 and a clock of the media capture system 42. Similarly, the status updating application 36 obtains the location of the mobile device 14, and thus the location of the user 16, from the location function 40. The location function 40 may be implemented in hardware, software, or a combination thereof and generally operates to determine or otherwise obtain the current location of the mobile device 14. For example, the location function 40 may be or include a Global Positioning System (GPS) receiver.

The crowd server 20 is implemented as a physical server or a number of physical servers that operate in a collaborative manner for purposes of load sharing or redundancy. While the details of the crowd server 20 are discussed below in detail, the crowd server 20 generally operates to receive location updates for the users 16 from the mobile devices 14 of the users 16. Based on the location updates, the crowd server 20 forms and tracks crowds of users. In addition, in some embodiments, the crowd server 20 operates to serve requests for status updates by identifying crowds of users that are relevant to the requests and obtaining status updates from users in the relevant crowds.

The system 10 also includes a media capture system 42 that operates to capture media content and transmit the media content to a broadcast Network Operations Center (NOC) 44, which in turn broadcasts the media content to a number of media playback devices such as media playback device 46. Note, however, that the media content captured by the media capture system 42 may be delivered or otherwise communicated to the media playback device 46 by other means.

The media capture system 42 includes a media capture device 48, an encoder 50, a clock 52, a location function 54, and a transmitter 56. The media capture device 48 is implemented in hardware or a combination of hardware and software and operates to capture a media content stream. In one embodiment, the media capture device 48 is a video recording device such as a video camera that operates to capture live video content. In another embodiment, the media capture device 48 is an audio recording device that operates to capture live audio content. The encoder 50 operates to encode the media content stream captured by the media capture device 48 with a time of capture and, in some embodiments, a location of capture for segments of the media content stream. The time of capture of a segment of the media content stream is the time at which the segment of the media content stream was captured and recorded by the media capture device 48. The location of capture of a segment of the media content stream is the location of the media capture device 48 at the time of capture of the segment of the media content stream. For example, if the media content stream is a video stream, then the video stream may include a number of scenes that are the segments of the video stream. Each of at least a subset of the scenes of the video stream, and preferably all of the scenes of the video stream, is encoded with a time of capture of the scene obtained from the clock 52 and, in some embodiments, a location of capture of the scene obtained from the location function 54.

The clock 52 may be implemented in software, hardware, or a combination thereof and operates to provide the current time of day and date. The location function 54 may be implemented in hardware, software, or a combination thereof and generally operates to determine or otherwise obtain the current location of the mobile device 14. For example, the location function 54 may be or include a GPS receiver. The transmitter 56 may be implemented in software, hardware, or a combination thereof. In this embodiment, the transmitter 56 operates to transmit the media content stream captured by the media capture device 48 and encoded with the times and, in some embodiment, locations of capture of the segments of the media content stream to the broadcast NOC 44 via a wireless network 57. The wireless network 57 may be a terrestrial wireless network, a satellite network, or a combination thereof.

It should be noted that while the media capture system 42 is illustrated as having only one media capture device 48, the present disclosure is not limited thereto. The media capture system 42 may alternatively include multiple media capture devices 48. Multiple media capture devices 48 may be desired, for example, at live sporting events such as college or professional football games or the like. In one embodiment, each of the media capture devices 48 has its own encoder 50, clock 52, and location function 54, and the encoded media content streams from the multiple media capture devices 48 are combined by the transmitter 56 to provide the media content stream for transmission to the broadcast NOC 44. Alternatively, the encoded media content streams may be transmitted by the transmitter 56 or separate transmitters 56, where the encoded media content streams are subsequently combined by the broadcast NOC 44 to provide the media content stream to be delivered to the media playback device 46. In another embodiment, the multiple media capture devices 48 share the same encoder 50, clock 52, and location function 54, and the captured media content from the multiple media capture devices 48 is combined prior to encoding by the encoder 50 and transmission by the transmitter 56.

The broadcast NOC 44 includes a receiver 58 and a transmit engine 60. In this embodiment, the receiver 58 receives the media content stream from the media capture system 42. The transmit engine 60 then broadcasts the media content stream to one or more media playback devices including the media playback device 46. The media content stream is broadcast over an existing terrestrial or satellite television network, an existing terrestrial or satellite radio network, or the like.

The media playback device 46 is a device having media playback capabilities such as, but not limited to, a set-top box, a television, a computer, an audio playback device, or the like. The media playback device 46 includes a network interface 62, a broadcast reception and playback function 64, and a status update display function 66. The network interface 62 is implemented in hardware or a combination of hardware and software and operates to communicatively couple the media playback device 46 to the network 18. The network interface 62 is either a wired network interface such as, for example, an Ethernet network interface or a wireless network interface such as, for example, an IEEE 802.11x wireless network interface. The broadcast reception and playback function 64 may be implemented in hardware, software, or a combination thereof and generally operates to receive the broadcast of the media content stream from the broadcast NOC 44 and provide playback of the media content stream. In this embodiment, the broadcast reception and playback function 64 also includes a network interface communicatively coupling the media playback device 46 to the broadcast NOC 44 over a corresponding network. The media playback device 46 outputs, or presents, the played media content stream via an internal display or speaker(s) or via an external display and/or speaker(s) depending on the particular embodiment. For example, the media playback device 46 may be a television with a built-in digital television tuner or a set-top box that displays played media content via a connected television or display. In addition to playback of the media content, the broadcast reception and playback function 64 extracts the time of capture and location of capture data from the media content and provides the extracted time of capture and location of capture data to the status update display function 66.

The status update display function 66 is preferably implemented in software, but is not limited thereto. For example, the status update display function 66 may be implemented as a widget. As discussed below in detail, the status update display function 66 uses the time of capture and, in some embodiments, the location of capture data for one or more segments of the media content stream received by the broadcast reception and playback function 64 to obtain relevant status updates. The status update display function 66 then displays or otherwise presents the relevant status updates during playback of the media content and, preferably, during playback of corresponding segments of the media content. It should be noted that, in an alternative embodiment, the status update display function 66 may be incorporated into the broadcast reception and playback function 64 rather than being a separate application.

In another embodiment, the contents of the widget are shown on a secondary device. The secondary device may be, for example, a smartphone, a Personal Digital Assistant (PDA), a laptop computer, a desktop computer, or similar device. In one embodiment, the secondary device is any device having the ability to show content in a web browser. In this embodiment, the user 68 would obtain a Uniform Resource Locator (URL) shown on the display attached to the media playback device 46 and enter this URL into the secondary device. By entering this URL into the secondary device, the user 68 is able to receive the status updates. For example, the URL may be a URL that enables the secondary device to request the status updates or to register for the status updates to be sent to the secondary device. Note that in this embodiment, the status updates may be tailored to that specific user 68 since the secondary device is inherently a single user device.

For each segment of the media content stream for which relevant status updates are obtained, in one embodiment, the relevant status updates include status updates sent in temporal proximity to the time of capture of the segment of the media content stream from the users 16 in one or more crowds of users. In another embodiment, the relevant status updates include status updates sent in temporal proximity to the time of capture of the segment of the media content stream from the users 16 in one or more crowds of users located in proximity to the location of capture of the segment of the media content stream at the time of capture of the media content stream. In another embodiment, the relevant status updates include status updates sent in temporal proximity to the time of capture of the segment of the media content stream from the users 16 in one or more crowds of users located in proximity to the location of capture of the segment of the media content stream at the time of capture of the media content stream and that match a user profile of a user 68 of the media playback device 46 to a predefined threshold degree. In another embodiment, the relevant status updates include status updates sent in temporal proximity to the time of capture of the segment of the media content stream from the users 16 in one or more crowds of users that match the user profile of the user 68 of the media playback device 46 to at least a predefined threshold degree.

In another embodiment, the relevant status updates include status updates sent in temporal proximity to the time of capture of the segment of the media content stream from the users 16 located in proximity to the location of capture of the segment of the media content stream at the time of capture of the segment of the media content stream. In another embodiment, the relevant status updates include status updates sent in temporal proximity to the time of capture of the segment of the media content stream from the users 16 located in proximity to the location of capture of the segment of the media content stream at the time of capture of the segment of the media content stream and that have user profiles that match the user profile of the user 68 of the media playback device 46 to at least a predefined threshold degree.

Figure 1B:
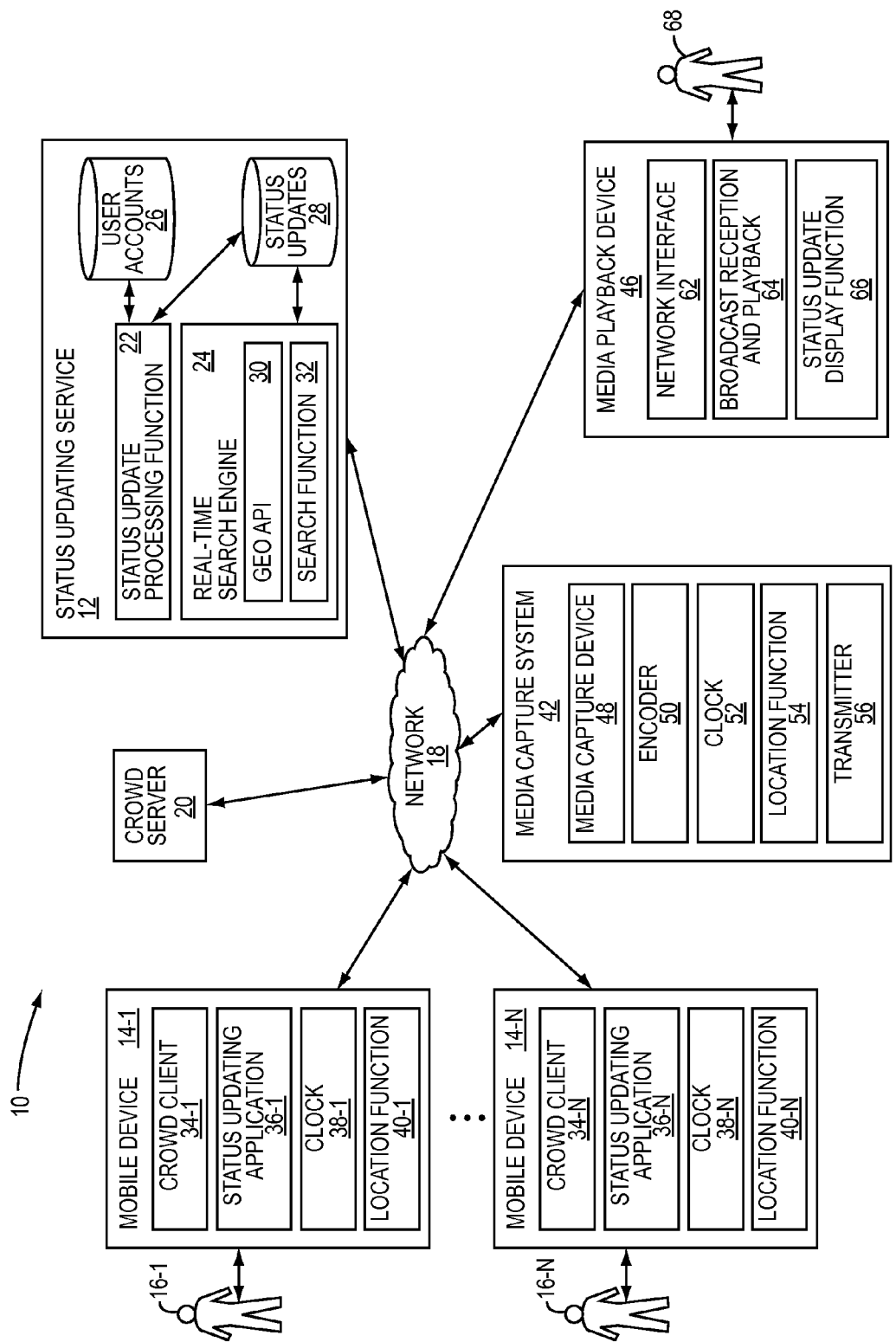
FIG. 1B illustrates the system for obtaining relevant status updates for a segment of a media content stream presenting the relevant status updates during playback of the media content stream and, preferably, during playback of the segment of the media content stream according to another embodiment of the present disclosure.

FIG. 1B illustrates the system 10 according to another embodiment of the present disclosure. This embodiment is substantially the same as that of FIG. 1A. However, in this embodiment, the media capture system 42 transmits or broadcasts the media content stream to the media playback device 46 via the network 18. Note that while not illustrated, the media content stream may be transmitted to the media playback device 46 over the network 18 via one or more intermediary nodes connected to the network 18 such as, for example, a streaming Internet Protocol (IP) server. As such, in this embodiment, the transmitter 56 of the media capture system 42 is enabled to transmit the media content stream over the network 18. Similarly, the broadcast reception and playback function 64 of the media playback device 46 is enabled to receive the media content stream from the network 18 via the network interface 62.

Figure 2:
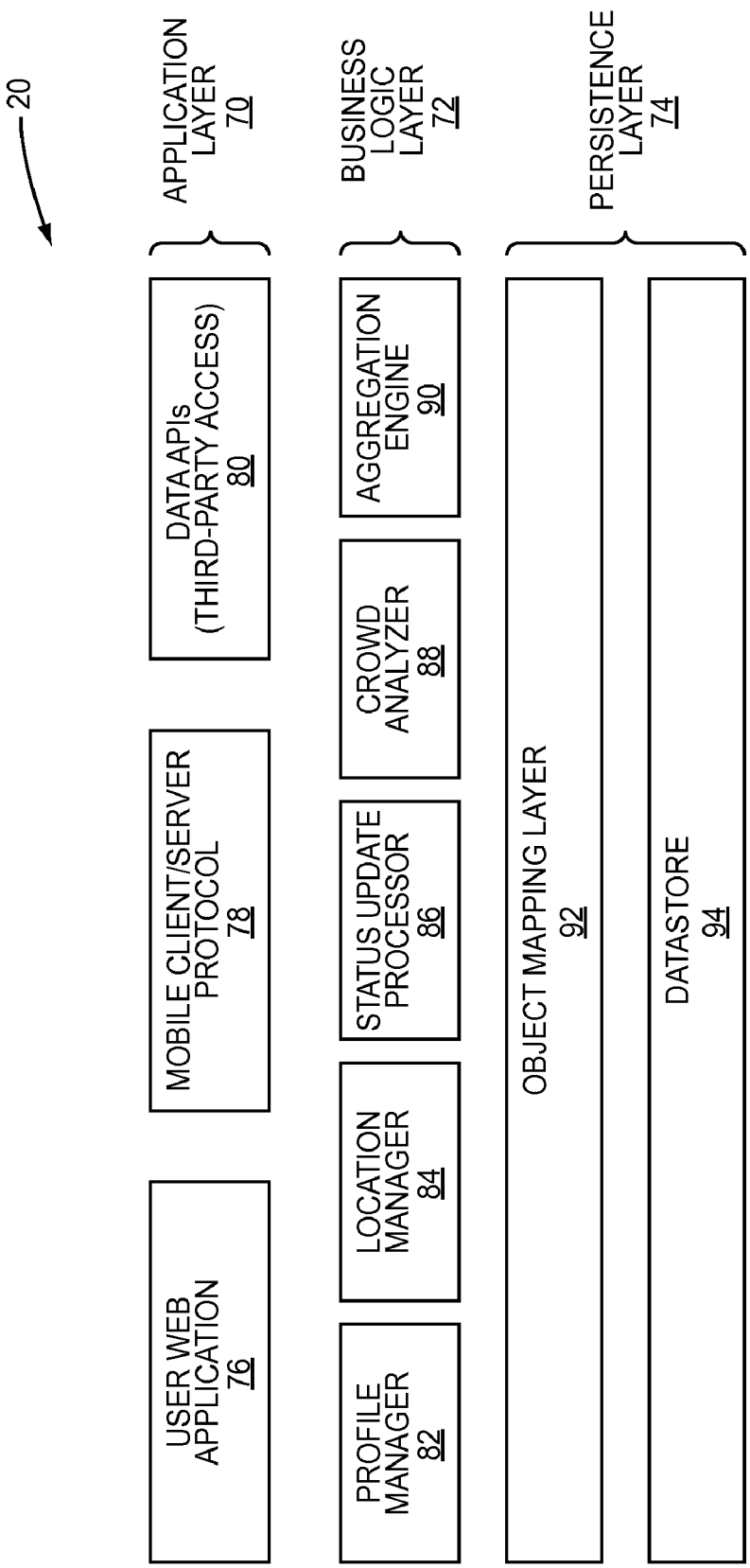
FIG. 2 is a functional block diagram of the crowd server of FIGS. 1A and 1B according to one embodiment of the present disclosure.

Before discussing the operation of the system 10 of FIGS. 1A and 1B in more detail, a description of the operation of the crowd server 20 to form and track crowds of users according to one embodiment of the present disclosure is beneficial. This description of the crowd server 20 is provided with respect to FIGS. 2 through 6. FIG. 2 is a block diagram of the crowd server 20 of FIGS. 1A and 1B according to one embodiment of the present disclosure. As illustrated, the crowd server 20 includes an application layer 70, a business logic layer 72, and a persistence layer 74. The application layer 70 includes a user web application 76, a mobile client/server protocol component 78, and one or more data APIs 80. The user web application 76 is preferably implemented in software and operates to provide a web interface for users, such as the users 16, to access the crowd server 20 via web browsers. As an example, the users 16 may initially access the crowd server 20 via the user web application 76 to register with the crowd server 20 and to download the crowd clients 34 to their mobile devices 14. The mobile client/server protocol component 78 is preferably implemented in software and operates to provide an interface between the crowd server 20 and the crowd clients 34 hosted by the mobile devices 14. The data APIs 80 enable third-party devices and/or services, such as the media playback device 46, to access the crowd server 20.

The business logic layer 72 includes a profile manager 82, a location manager 84, a status update processor 86, a crowd analyzer 88, and an aggregation engine 90, each of which is preferably implemented in software. The profile manager 82 generally operates to obtain user profiles of the users 16 and store the user profiles of the users 16 in the persistence layer 74. The profile manager 82 may obtain the user profiles of the users 16 from the users 16 via corresponding user input at the mobile devices 14, obtain the user profiles of the users 16 from a social networking service such as, for example, the Facebook® social networking service, or the like. The location manager 84 operates to obtain location updates for the users 16. In this embodiment, the location manager 84 receives the location updates directly from the mobile devices 14 of the users 16. However, in another embodiment, the mobile devices 14 may first provide the location updates for the users 16 to a location service such as, for example, Yahoo!'s FireEagle service, where the location manager 84 then obtains the location updates from the location service. The status update processor 86 generally operates to obtain status updates made by the users 16 from the status updating service 12. The crowd analyzer 88 operates to form and track crowds of users. In one embodiment, the crowd analyzer 88 utilizes a spatial crowd formation algorithm. However, the present disclosure is not limited thereto. The aggregation engine 90 generally operates to generate aggregate profile data for crowds of users.

The persistence layer 74 includes an object mapping layer 92 and a datastore 94. The object mapping layer 92 is preferably implemented in software. The datastore 94 is preferably a relational database, which is implemented in a combination of hardware (i.e., physical data storage hardware) and software (i.e., relational database software). In this embodiment, the business logic layer 72 is implemented in an object-oriented programming language such as, for example, Java. As such, the object mapping layer 92 operates to map objects used in the business logic layer 72 to relational database entities stored in the datastore 94. Note that, in one embodiment, data is stored in the datastore 94 in a Resource Description Framework (RDF) compatible format.

In an alternative embodiment, rather than being a relational database, the datastore 94 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the crowd server 20 may be designed to accept raw FOAF files describing persons, their friends, and their interests. These FOAF files are currently output by some social networking services such as Livejournal and Facebook. The crowd server 20 may then persist RDF descriptions of the users 16 as a proprietary extension of the FOAF vocabulary that includes additional properties desired for the system 10.

Figure 3:
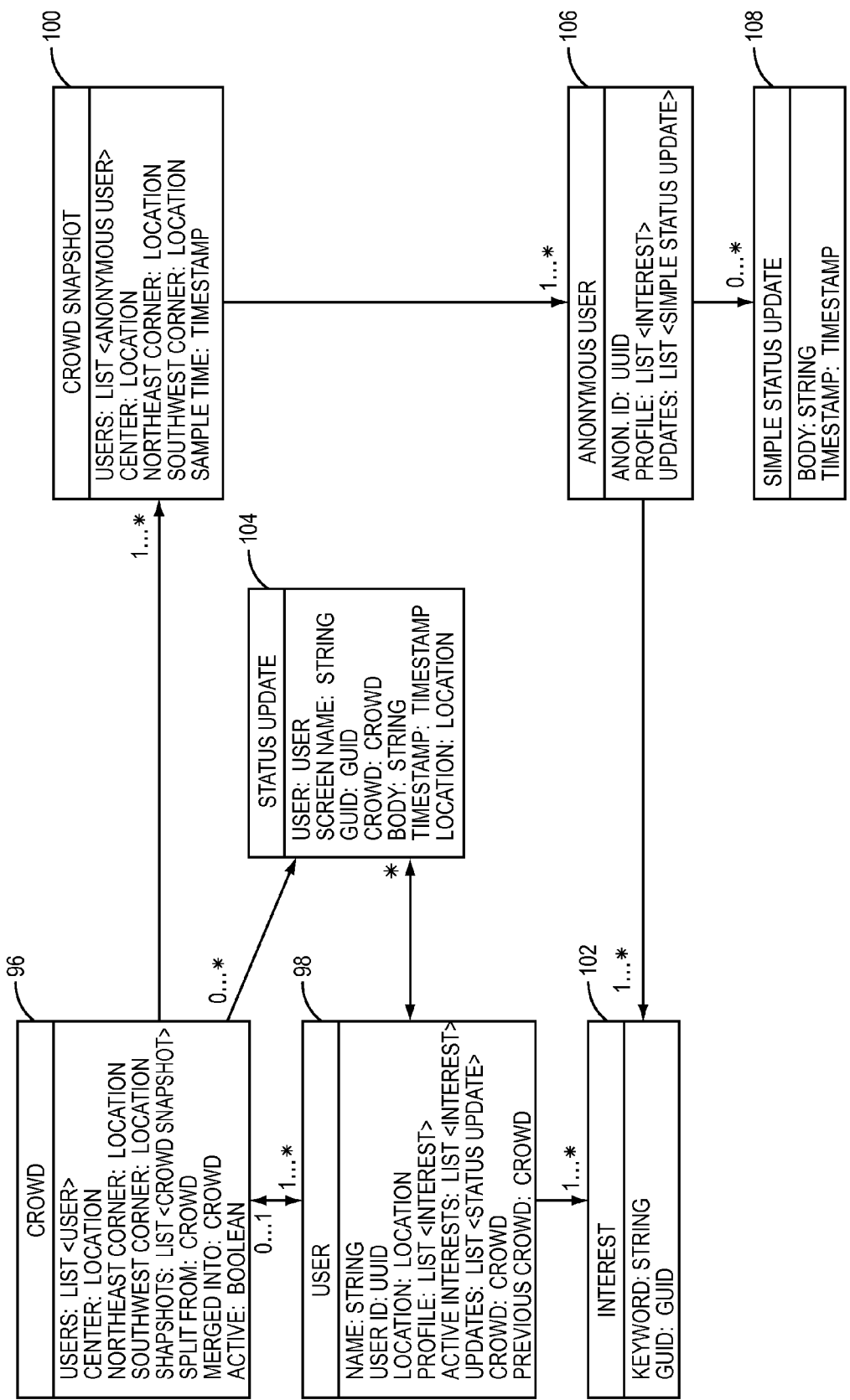
FIG. 3 illustrates exemplary data structures utilized by the crowd server of FIGS. 1A and 1B to form and track crowds of users according to one embodiment of the present disclosure.

FIG. 3 illustrates exemplary data records that may be used to represent crowds that are currently formed and crowd snapshots captured for crowds over time according to one embodiment of the present disclosure. As illustrated, for each crowd created by the crowd analyzer 88 of the crowd server 20, a corresponding crowd record 96 is created and stored in the datastore 94 of the crowd server 20. The crowd record 96 for a crowd includes a users field, a center field, a North East corner field, a South West corner field, a snapshots field, a split from field, a merged into field, and an active field. The users field stores a set or list of user records 98 corresponding to a subset of the users 16 that are currently in the crowd. The center field stores a location corresponding to a center of the crowd. The North East corner field stores a location corresponding to a North East corner of the crowd. Similarly, the South West corner field stores a location of a South West corner of the crowd. Together, the North East corner and the South West corner define a bounding box for the crowd, where the edges of the bounding box pass through the current locations of the outermost users in the crowd. The center, North East corner, and South West corner of the crowd may each be defined by latitude and longitude coordinates and optionally an altitude. Together, the North East corner, the South West corner, and the center of the crowd form spatial information defining the location of the crowd. Note, however, that the spatial information defining the location of the crowd may include additional or alternative information depending on the particular implementation.

The snapshots field stores a list of crowd snapshot records 100 corresponding to crowd snapshots captured for the crowd over time. The split from field may be used to store a reference to a crowd record corresponding to another crowd from which the crowd split, and the merged into field may be used to store a reference to a crowd record corresponding to another crowd into which the crowd has been merged. The active field stores a Boolean value that represents whether or not the crowd is an active crowd The user record 98 includes a name field, a user ID field, a location field, a profile field, an active interests field, an updates field, a crowd field, and a previous crowd field. The name field stores a string that is the name of the user 16 for which the user record 98 is stored, which may be the birth name of the user 16, a username or screen name of the user 16, or the like. The user ID field stores a user ID of the user 16. The location field stores the current location of the user 16, which may be defined by latitude and longitude coordinates and optionally an altitude. The profile field stores the user profile of the user 16. In this embodiment, the user profile of the user 16 is stored as a list of interest records 102. The active interests field stores a reference to the interest record or a list of interest records that identify one or more interests from the user profile of the user 16 that the user 16 has selected as active interests. The active interest(s) of the user 16 may be used when comparing the user profile of the user 16 to other users 16 to, for example, generate aggregate profile data for crowds of users. The updates field stores a list of status update records 104 for status updates received from the user 16. The crowd field stores a reference to a crowd record 96 of the crowd of which the user 16 is currently a member. The previous crowd field may be used to store a reference to a crowd record 96 of a crowd of which the user 16 was previously a member.

The interest record 102 includes a keyword field and a Globally Unique Identifier (GUID) field. The keyword field stores a string that is a keyword that corresponds to the interest stored by the interest record 102. The GUID field stores an identifier assigned to the interest. The status update record 104 includes a user field, a screen name field, a GUID field, a crowd field, a body field, a timestamp field, and a location field. The user field stores a reference to the user record 98 of the user 16 that provided the status update. The screen name field stores a username or screen name of the user 16 that provided the status update. The GUID field stores an identifier assigned to the status update. The crowd field stores a reference to the crowd in which the user 16 that provided the status update was a member at the time of providing the status update. The body field stores the body of the status update, which in this embodiment is a text string. The timestamp field stores a timestamp that identifies the time and date on which the status update was sent by the user 16. The location field stores a location at which the user 16 was located when the status update was sent.

The crowd snapshot record 100 includes an anonymous users field, a center field, a North East corner field, a South West corner field, and a sample time field. The anonymous users field stores a set or list of anonymous user records 106, which are anonymized versions of the user records 98 for the users 16 that are in the crowd at a time the crowd snapshot was created. The center field stores a location corresponding to a center of the crowd at the time of creating the crowd snapshot (i.e., the sample time). The North East corner field stores a location corresponding to a North East corner of a bounding box for the crowd at the time the crowd snapshot was created. Similarly, the South West corner field stores a location of a South West corner of the bounding box for the crowd at the time the crowd snapshot was created. Together, the North East corner, the South West corner, and the center of the crowd form spatial information defining the location of the crowd at the time the crowd snapshot was created. Note, however, that the spatial information defining the location of the crowd at the time the crowd snapshot was created may include additional or alternative information depending on the particular implementation. The sample time field stores a timestamp indicating a time at which the crowd snapshot was created. The timestamp preferably includes a date and a time of day at which the crowd snapshot was created.

The anonymous user record 106 includes an anonymous ID field, a profile field, and an updates field. The anonymous ID field stores an anonymous user ID, which is preferably a unique user ID that is not tied, or linked, back to any of the users 16 and particularly not tied back to the user 16 or the user record 98 for which the anonymous user record 106 has been created. In one embodiment, the anonymous user records 106 for the crowd snapshot record 100 are anonymized versions of the user records 98 of the users 16 in the crowd at the time the crowd snapshot was created. The profile field stores a user profile of the anonymous user, which in this embodiment is a list of interest records 102. In this embodiment, the user profile of the anonymous user record 106 is the same as the user profile of the corresponding user record 98 of which the anonymous user record 106 is an anonymized version. However, other anonymization techniques may be used. For example, the interests of all of the users 16 in the crowd may be randomly distributed across the anonymous user records 106 generated for the corresponding user records 98 of the users 16 in the crowd at the time that the crowd snapshot was created. The updates field stores a list of simple status update records 108, where the simple status update records 108 are anonymized versions of the status update records of the users 16 in the crowd for status updates sent by the users 16 in the crowd during the time period for which the crowd snapshot was created. The simple status update record 108 includes a body field and a timestamp field. The body field stores the body from the body field of the corresponding status update record 104. The timestamp field stores the timestamp from the timestamp field of the corresponding status update record 104.

FIGS. 4A through 4D illustrate one embodiment of a spatial crowd formation process that may be performed by the crowd analyzer 88 of the crowd server 20 to provide crowd formation and crowd tracking according to one embodiment of the present disclosure. Note, however, that this process is exemplary and is not intended to limit the scope of the present disclosure. Other crowd formation and tracking processes may be used. In this embodiment, the spatial crowd formation process is triggered in response to receiving a location update for one of the users 16 and is preferably repeated for each location update received for the users 16. As such, first, the crowd analyzer 88 receives a location update, or a new location, for one of the users 16 (step 1000). In response, the crowd analyzer 88 retrieves an old location of the user 16, if any (step 1002). The old location is the current location of the user 16 prior to receiving the new location of the user 16. The crowd analyzer 88 then creates a new bounding box of a predetermined size centered at the new location of the user 16 (step 1004) and an old bounding box of a predetermined size centered at the old location of the user 16, if any (step 1006). The predetermined size of the new and old bounding boxes may be any desired size. As one example, the predetermined size of the new and old bounding boxes is 40 meters by 40 meters. Note that if the user 16 does not have an old location (i.e., the location received in step 1000 is the first location received for the user 16), then the old bounding box is essentially null. Also note that while bounding "boxes" are used in this example, the bounding regions may be of any desired shape.

Next, the crowd analyzer 88 determines whether the new and old bounding boxes overlap (step 1008). If so, the crowd analyzer 88 creates a bounding box encompassing the new and old bounding boxes (step 1010). For example, if the new and old bounding boxes are 40×40 meter regions and a 1×1 meter square at the North East corner of the new bounding box overlaps a 1×1 meter square at the South West corner of the old bounding box, the crowd analyzer 88 may create a 79×79 meter square bounding box encompassing both the new and old bounding boxes.

The crowd analyzer 88 then determines individual users and crowds relevant to the bounding box created in step 1010 (step 1012). Note that the crowds relevant to the bounding box are pre-existing crowds resulting from previous iterations of the spatial crowd formation process. In this embodiment, the crowds relevant to the bounding box are crowds having crowd bounding boxes that are within or overlap the bounding box established in step 1010. In order to determine the relevant crowds, the crowd analyzer 88 queries the datastore 94 of the crowd server 20 to obtain crowd records 96 for crowds that are within or overlap the bounding box established in step 1010. The individual users relevant to the bounding box are the users 16 that are currently located within the bounding box and are not already members of a crowd. In order to identify the individual users that are relevant to the bounding box, the crowd analyzer 88 queries the datastore 94 of the crowd server 20 for the user records 98 of the users 16 that are currently located in the bounding box created in step 1010 and are not already members of a crowd. Next, the crowd analyzer 88 computes an optimal inclusion distance for the individual users based on user density within the bounding box (step 1014). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}},$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 88 then creates a crowd of one user for each individual user within the bounding box established in step 1010 that is not already included in a crowd and sets the optimal inclusion distance for those crowds to the initial optimal inclusion distance (step 1016). The crowds created for the individual users are temporary crowds created for purposes of performing the crowd formation process. At this point, the process proceeds to FIG. 4B where the crowd analyzer 88 analyzes the crowds in the bounding box established in step 1010 to determine whether any of the crowd members (i.e., users 16 in the crowds) violate the optimal inclusion distance of their crowds (step 1018). Any crowd member that violates the optimal inclusion distance of his or her crowd is then removed from that crowd and the previous crowd fields in the corresponding user records 98 are set (step 1020). More specifically, in this embodiment, a user 16 that is a member of a crowd is removed from the crowd by removing the user record 98 of the user 16 from the set or list of user records in the crowd record 96 of the crowd and setting the previous crowd stored in the user record 98 of the user 16 to the crowd from which the user 16 has been removed. The crowd analyzer 88 then creates a crowd of one user for each of the users 16 removed from their crowds in step 1020 and sets the optimal inclusion distance for the newly created crowds to the initial optimal inclusion distance (step 1022).

Next, the crowd analyzer 88 determines the two closest crowds in the bounding box (step 1024) and a distance between the two closest crowds (step 1026). The distance between the two closest crowds is the distance between the crowd centers of the two closest crowds, which are stored in the crowd records 96 for the two closest crowds. The crowd analyzer 88 then determines whether the distance between the two closest crowds is less than the optimal inclusion distance of a larger of the two closest crowds (step 1028). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 88 determines whether the distance between the two closest crowds is less than the optimal inclusion distances of both of the crowds. As another alternative, if the two closest crowds are of the same size, the crowd analyzer 88 may compare the distance between the two closest crowds to an average of the optimal inclusion distances of the two crowds.

If the distance between the two closest crowds is greater than the optimal inclusion distance, the process proceeds to step 1040. However, if the distance between the two closest crowds is less than the optimal inclusion distance, the two crowds are merged (step 1030). The manner in which the two crowds are merged differs depending on whether the two crowds are pre-existing crowds or temporary crowds created for the spatial crowd formation process. If both crowds are pre-existing crowds, one of the two crowds is selected as a non-surviving crowd and the other is selected as a surviving crowd. If one crowd is larger than the other, the smaller crowd is selected as the non-surviving crowd and the larger crowd is selected as a surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd and setting the merged into field of the non-surviving crowd to a reference to the crowd record 96 of the surviving crowd. In addition, the crowd analyzer 88 sets the previous crowd fields of the user records 98 in the set or list of user records from the non-surviving crowd to a reference to the crowd record 96 of the non-surviving crowd.

If one of the crowds is a temporary crowd and the other crowd is a pre-existing crowd, the temporary crowd is selected as the non-surviving crowd, and the pre-existing crowd is selected as the surviving crowd. The non-surviving crowd is then merged into the surviving crowd by adding the set or list of user records from the crowd record 96 of the non-surviving crowd to the set or list of user records in the crowd record 96 of the surviving crowd. However, since the non-surviving crowd is a temporary crowd, the previous crowd field(s) of the user record(s) 98 of the user(s) 16 in the non-surviving crowd are not set to a reference to the crowd record 96 of the non-surviving crowd. Similarly, the crowd record 96 of the temporary crowd may not have a merged into field, but, if it does, the merged into field is not set to a reference to the surviving crowd.

If both the crowds are temporary crowds, one of the two crowds is selected as a non-surviving crowd and the other is selected as a surviving crowd. If one crowd is larger than the other, the smaller crowd is selected as the non-surviving crowd and the larger crowd is selected as the surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd. However, since the non-surviving crowd is a temporary crowd, the previous crowd field(s) of the user record(s) 98 of the user(s) 16 in the non-surviving crowd are not set to a reference to the crowd record of the non-surviving crowd. Similarly, the crowd record 96 of the temporary crowd may not have a merged into field, but, if it does, the merged into field is not set to a reference to the surviving crowd.

Next, the crowd analyzer 88 removes the non-surviving crowd (step 1032). In this embodiment, the manner in which the non-surviving crowd is removed depends on whether the non-surviving crowd is a pre-existing crowd or a temporary crowd. If the non-surviving crowd is a pre-existing crowd, the removal process is performed by removing or nulling the users field, the North East corner field, the South West corner field, and the center field of the crowd record 96 of the non-surviving crowd. In this manner, the spatial information for the non-surviving crowd is removed from the corresponding crowd record 96 such that the non-surviving or removed crowd will no longer be found in response to spatial-based queries on the datastore 94. However, the crowd snapshots for the non-surviving crowd are still available via the crowd record 96 for the non-surviving crowd. In contrast, if the non-surviving crowd is a temporary crowd, the crowd analyzer 88 may remove the crowd by deleting the corresponding crowd record 96.

The crowd analyzer 88 also computes a new crowd center for the surviving crowd (step 1034). A center of mass algorithm may be used to compute the crowd center of a crowd. In addition, a new optimal inclusion distance for the surviving crowd is computed (step 1036). In one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right),$$

$$\text{optimal\_inclusion\_dist} = \text{average} + \sqrt{\left( \frac{1}{n} \cdot \sum_{i=1}^{n} (d_i - \text{average})^2 \right)},$$

where n is the number of users in the crowd and $d_i$ is a distance between the ith user and the crowd center. In other words, the new optimal inclusion distance is computed as the average of the initial optimal inclusion distance and the distances between the users 16 in the crowd and the crowd center plus one standard deviation.

At this point, the crowd analyzer 88 determines whether a maximum number of iterations have been performed (step 1038). The maximum number of iterations is a predefined number that ensures that the crowd formation process does not indefinitely loop over steps 1018 through 1036 or loop over steps 1018 through 1036 more than a desired maximum number of times. If the maximum number of iterations has not been reached, the process returns to step 1018 and is repeated until either the distance between the two closest crowds is not less than the optimal inclusion distance of the larger crowd or the maximum number of iterations has been reached. At that point, the crowd analyzer 88 removes crowds with less than three users, or members (step 1040) and the process ends. As discussed above, in this embodiment, the manner in which a crowd is removed depends on whether the crowd is a pre-existing crowd or a temporary crowd. If the crowd is a pre-existing crowd, a removal process is performed by removing or nulling the users field, the North East corner field, the South West corner field, and the center field of the crowd record 96 of the crowd. In this manner, the spatial information for the crowd is removed from the corresponding crowd record 96 such that the crowd will no longer be found in response to spatial-based queries on the datastore 94. However, the crowd snapshots for the crowd are still available via the crowd record 96 for the crowd. In contrast, if the crowd is a temporary crowd, the crowd analyzer 88 may remove the crowd by deleting the corresponding crowd record 96. In this manner, crowds having less than three members are removed in order to maintain privacy of individuals as well as groups of two users (e.g., a couple). Note that while the minimum number of users in a crowd is preferably three, the present disclosure is not limited thereto. The minimum number of users in a crowd may alternatively be any desired number greater than or equal to two.

Figure 4A:
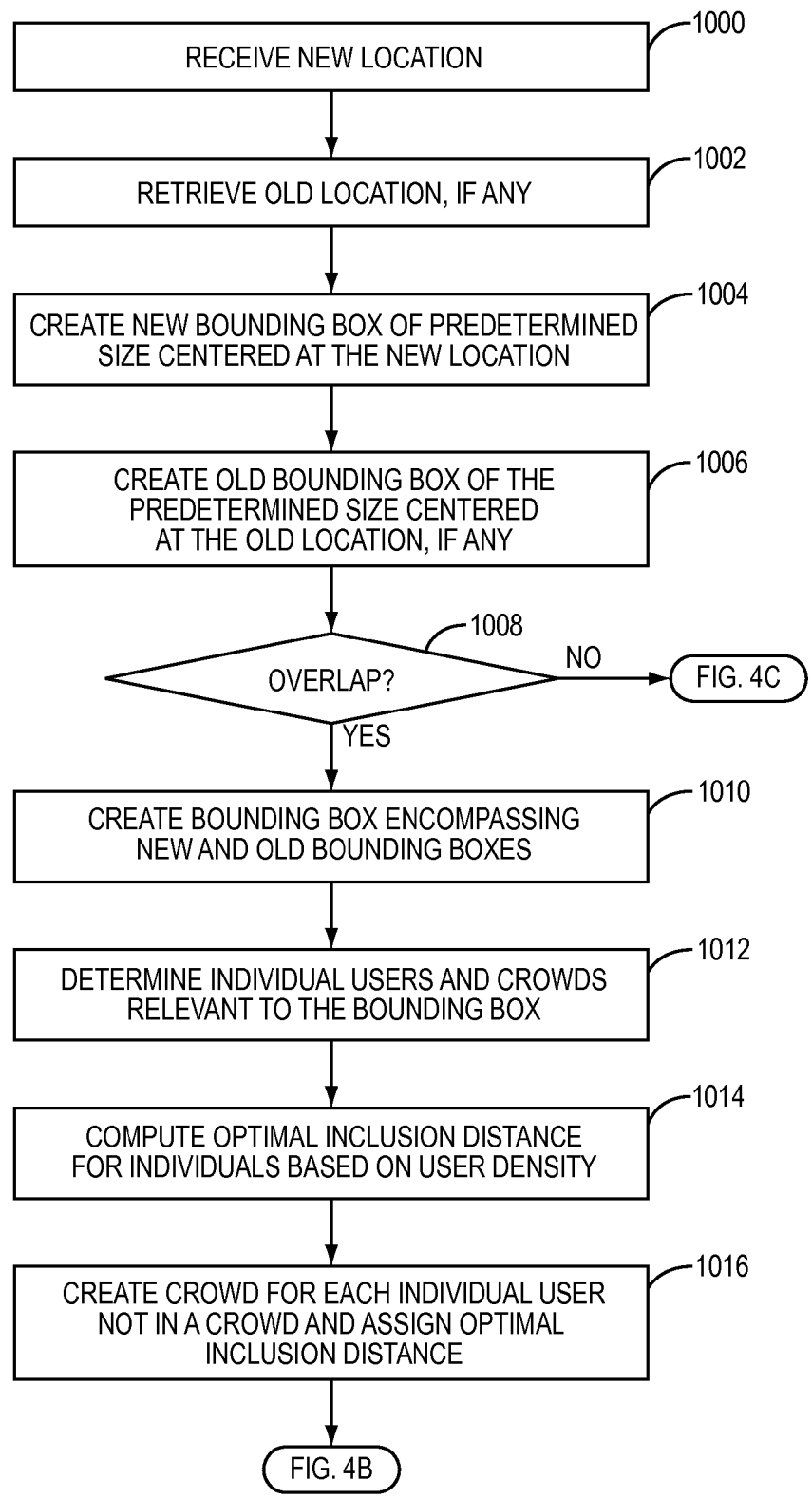
FIGS. 4A through 4D illustrate a crowd formation process performed by the crowd server according to one embodiment of the present disclosure.
Figure 4B:
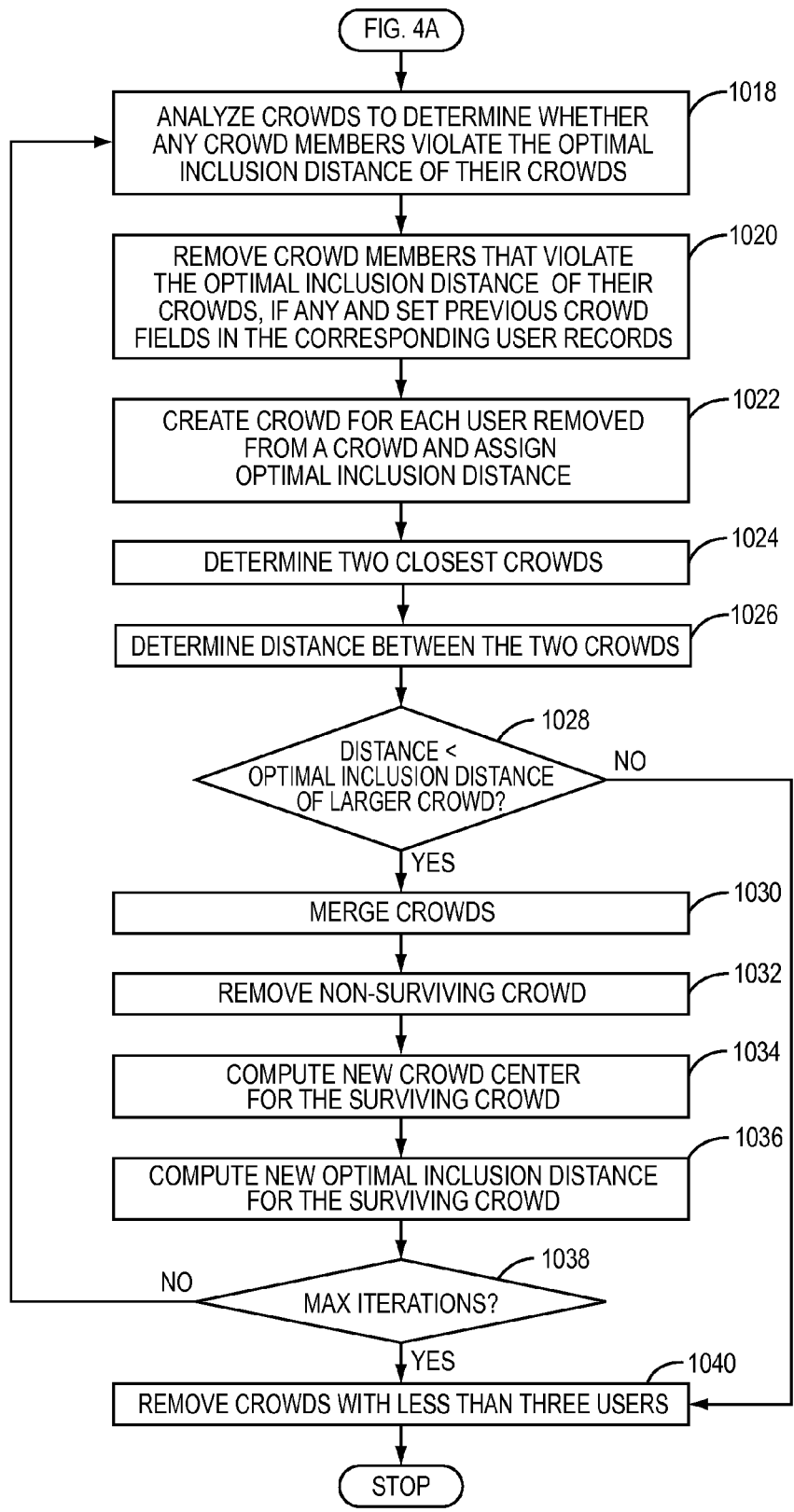
Figure 4C:
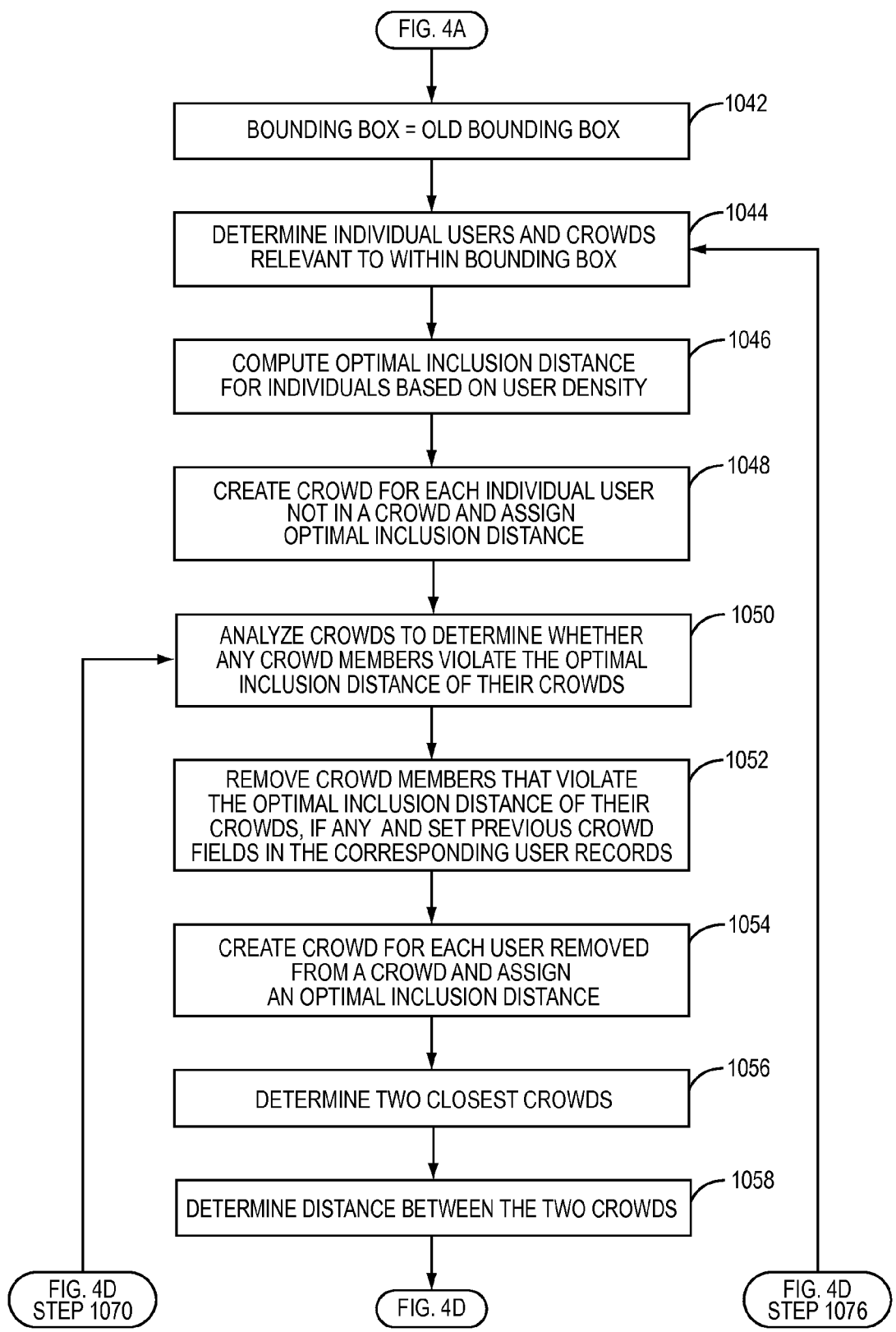
Figure 4D:
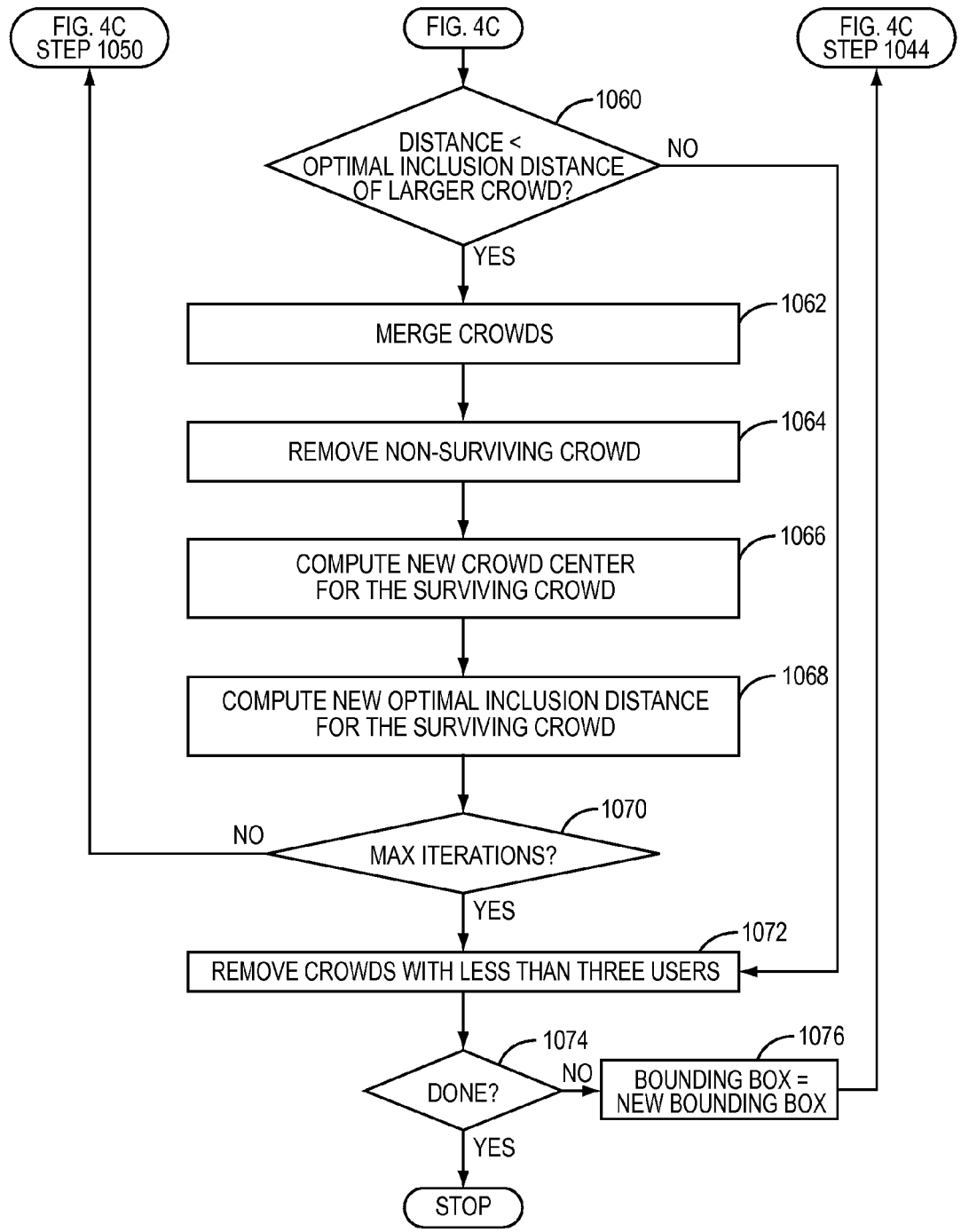

Returning to step 1008 in FIG. 4A, if the new and old bounding boxes do not overlap, the process proceeds to FIG. 4C and the bounding box to be processed is set to the old bounding box (step 1042). In general, the crowd analyzer 88 then processes the old bounding box in much that same manner as described above with respect to steps 1012 through 1040. More specifically, the crowd analyzer 88 determines the individual users and crowds relevant to the bounding box (step 1044). Again, note that the crowds relevant to the bounding box are pre-existing crowds resulting from previous iterations of the spatial crowd formation process. In this embodiment, the crowds relevant to the bounding box are crowds having crowd bounding boxes that are within or overlap the bounding box. The individual users relevant to the bounding box are users 16 that are currently located within the bounding box and are not already members of a crowd. Next, the crowd analyzer 88 computes an optimal inclusion distance for individual users based on user density within the bounding box (step 1046). The optimal inclusion distance may be computed as described above with respect to step 1014 of FIG. 4A.

The crowd analyzer 88 then creates a crowd of one user for each individual user within the bounding box that is not already included in a crowd and sets the optimal inclusion distance for the crowds to the initial optimal inclusion distance (step 1048). The crowds created for the individual users are temporary crowds created for purposes of performing the crowd formation process. At this point, the crowd analyzer 88 analyzes the crowds in the bounding box to determine whether any crowd members (i.e., users 16 in the crowds) violate the optimal inclusion distance of their crowds (step 1050). Any crowd member that violates the optimal inclusion distance of his or her crowd is then removed from that crowd and the previous crowd fields in the corresponding user records 98 are set (step 1052). More specifically, in this embodiment, a user 16 that is a member of a crowd is removed from the crowd by removing the user record 98 of the user 16 from the set or list of user records in the crowd record 96 of the crowd and setting the previous crowd stored in the user record 98 of the user 16 to the crowd from which the user 16 has been removed. The crowd analyzer 88 then creates a crowd for each of the users 16 removed from their crowds in step 1052 and sets the optimal inclusion distance for the newly created crowds to the initial optimal inclusion distance (step 1054).

Next, the crowd analyzer 88 determines the two closest crowds in the bounding box (step 1056) and a distance between the two closest crowds (step 1058). The distance between the two closest crowds is the distance between the crowd centers of the two closest crowds. The crowd analyzer 88 then determines whether the distance between the two closest crowds is less than the optimal inclusion distance of a larger of the two closest crowds (step 1060). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 88 determines whether the distance between the two closest crowds is less than the optimal inclusion distances of both of the two closest crowds. As another alternative, if the two closest crowds are of the same size, the crowd analyzer 88 may compare the distance between the two closest crowds to an average of the optimal inclusion distances of the two closest crowds.

If the distance between the two closest crowds is greater than the optimal inclusion distance, the process proceeds to step 1072. However, if the distance between the two closest crowds is less than the optimal inclusion distance, the two crowds are merged (step 1062). The manner in which the two crowds are merged differs depending on whether the two crowds are pre-existing crowds or temporary crowds created for the spatial crowd formation process. If both crowds are pre-existing crowds, one of the two crowds is selected as a non-surviving crowd and the other is selected as a surviving crowd. If one crowd is larger than the other, the smaller crowd is selected as the non-surviving crowd and the larger crowd is selected as the surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd and setting the merged into field of the non-surviving crowd to a reference to the crowd record of the surviving crowd. In addition, the crowd analyzer 88 sets the previous crowd fields of the set or list of user records from the non-surviving crowd to a reference to the crowd record 96 of the non-surviving crowd.

If one of the crowds is a temporary crowd and the other crowd is a pre-existing crowd, the temporary crowd is selected as the non-surviving crowd, and the pre-existing crowd is selected as the surviving crowd. The non-surviving crowd is then merged into the surviving crowd by adding the user records 98 from the set or list of user records from the crowd record 96 of the non-surviving crowd to the set or list of user records in the crowd record 96 of the surviving crowd. However, since the non-surviving crowd is a temporary crowd, the previous crowd field(s) of the user record(s) 98 of the user(s) in the non-surviving crowd are not set to a reference to the crowd record 96 of the non-surviving crowd. Similarly, the crowd record 96 of the temporary crowd may not have a merged into field, but, if it does, the merged into field is not set to a reference to the surviving crowd.

If both the crowds are temporary crowds, one of the two crowds is selected as a non-surviving crowd and the other is selected as a surviving crowd. If one crowd is larger than the other, the smaller crowd is selected as the non-surviving crowd and the larger crowd is selected as the surviving crowd. If the two crowds are of the same size, one of the crowds is selected as the surviving crowd and the other crowd is selected as the non-surviving crowd using any desired technique. The non-surviving crowd is then merged into the surviving crowd by adding the set or list of user records for the non-surviving crowd to the set or list of user records for the surviving crowd. However, since the non-surviving crowd is a temporary crowd, the previous crowd field(s) of the user record(s) 98 of the user(s) in the non-surviving crowd are not set to a reference to the crowd record 96 of the non-surviving crowd. Similarly, the crowd record 96 of the temporary crowd may not have a merged into field, but, if it does, the merged into field is not set to a reference to the surviving crowd.

Next, the crowd analyzer 88 removes the non-surviving crowd (step 1064). In this embodiment, the manner in which the non-surviving crowd is removed depends on whether the non-surviving crowd is a pre-existing crowd or a temporary crowd. If the non-surviving crowd is a pre-existing crowd, the removal process is performed by removing or nulling the users field, the North East corner field, the South West corner field, and the center field of the crowd record 96 of the non-surviving crowd. In this manner, the spatial information for the non-surviving crowd is removed from the corresponding crowd record 96 such that the non-surviving or removed crowd will no longer be found in response to spatial-based queries on the datastore 94. However, the crowd snapshots for the non-surviving crowd are still available via the crowd record 96 for the non-surviving crowd. In contrast, if the non-surviving crowd is a temporary crowd, the crowd analyzer 88 may remove the crowd by deleting the corresponding crowd record 96.

The crowd analyzer 88 also computes a new crowd center for the surviving crowd (step 1066). Again, a center of mass algorithm may be used to compute the crowd center of a crowd. In addition, a new optimal inclusion distance for the surviving crowd is computed (step 1068). In one embodiment, the new optimal inclusion distance for the surviving crowd is computed in the manner described above with respect to step 1036 of FIG. 4B.

At this point, the crowd analyzer 88 determines whether a maximum number of iterations have been performed (step 1070). If the maximum number of iterations has not been reached, the process returns to step 1050 and is repeated until either the distance between the two closest crowds is not less than the optimal inclusion distance of the larger crowd or the maximum number of iterations has been reached. At that point, the crowd analyzer 88 removes crowds with less than three users, or members (step 1072). As discussed above, in this embodiment, the manner in which a crowd is removed depends on whether the crowd is a pre-existing crowd or a temporary crowd. If the crowd is a pre-existing crowd, a removal process is performed by removing or nulling the users field, the North East corner field, the South West corner field, and the center field of the crowd record 96 of the crowd. In this manner, the spatial information for the crowd is removed from the corresponding crowd record 96 such that the crowd will no longer be found in response to spatial-based queries on the datastore 94. However, the crowd snapshots for the crowd are still available via the crowd record 96 for the crowd. In contrast, if the crowd is a temporary crowd, the crowd analyzer 88 may remove the crowd by deleting the corresponding crowd record 96. In this manner, crowds having less than three members are removed in order to maintain privacy of individuals as well as groups of two users (e.g., a couple). Again, note that a minimum number of users is the crowd may alternatively be any desired number greater than or equal to two.

The crowd analyzer 88 then determines whether the crowd formation process for the new and old bounding boxes is done (step 1074). In other words, the crowd analyzer 88 determines whether both the new and old bounding boxes have been processed. If not, the bounding box is set to the new bounding box (step 1076), and the process returns to step 1044 and is repeated for the new bounding box. Once both the new and old bounding boxes have been processed, the crowd formation process ends.

Figure 5:
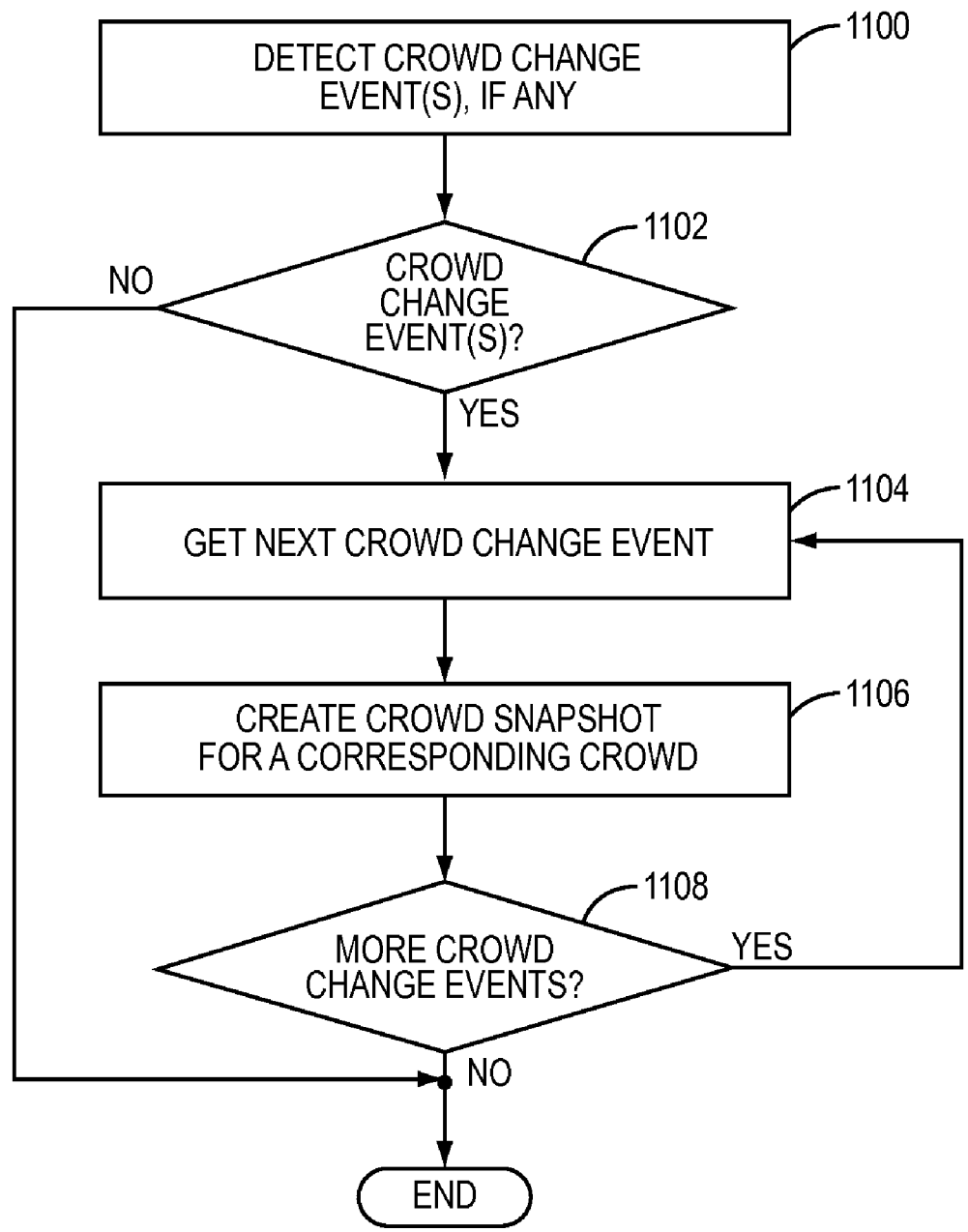
FIG. 5 illustrates a process performed by the crowd server to create crowd snapshots for tracking crowds according to one embodiment of the present disclosure.

FIG. 5 illustrates a process for creating crowd snapshots according to one embodiment of the present disclosure. In this embodiment, after the spatial crowd formation process of FIGS. 4A through 4D is performed in response to a location update for a user 16, the crowd analyzer 88 detects crowd change events, if any, for the relevant crowds (step 1100). The relevant crowds are pre-existing crowds that are within the bounding region(s) processed during the spatial crowd formation process in response to the location update for the user 16. The crowd analyzer 88 may detect crowd change events by comparing the crowd records 96 of the relevant crowds before and after performing the spatial crowd formation process in response to the location update for the user 16. The crowd change events may be a change in the users 16 in the crowd, a change to a location of one of the users 16 within the crowd, or a change in the spatial information for the crowd (e.g., the North East corner, the South West corner, or the crowd center). Note that if multiple crowd change events are detected for a single crowd, then those crowd change events are preferably consolidated into a single crowd change event.

Next, the crowd analyzer 88 determines whether there are any crowd change events (step 1102). If not, the process ends. Otherwise, the crowd analyzer 88 gets the next crowd change event (step 1104) and generates a crowd snapshot for a corresponding crowd (step 1106). More specifically, the crowd change event identifies the crowd record 96 stored for the crowd for which the crowd change event was detected. A crowd snapshot is then created for that crowd by creating a new crowd snapshot record 100 for the crowd and adding the new crowd snapshot record 100 to the list of crowd snapshots stored in the crowd record 96 for the crowd. As discussed above, the crowd snapshot record 100 includes a set or list of anonymous user records 106, which are anonymized versions of the user records 98 for the users 16 in the crowd at the current time. In addition, the crowd snapshot record 100 includes the North East corner, the South West corner, and the center of the crowd at the current time as well as a timestamp defining the current time as the sample time at which the crowd snapshot record 100 was created. In some embodiments, the anonymous user records 106 include corresponding lists of simple status update records 108. The simple status update records 108 store anonymized versions of the status update records 104 sent by the users 16 in the crowd at the time of creating the crowd snapshot during a period of time between the creation of the immediately preceding crowd snapshot for the crowd and the current time. After creating the crowd snapshot, the crowd analyzer 88 determines whether there are any more crowd change events (step 1108). If so, the process returns to step 1104 and is repeated for the next crowd change event. Once all of the crowd change events are processed, the process ends.

Figure 6:
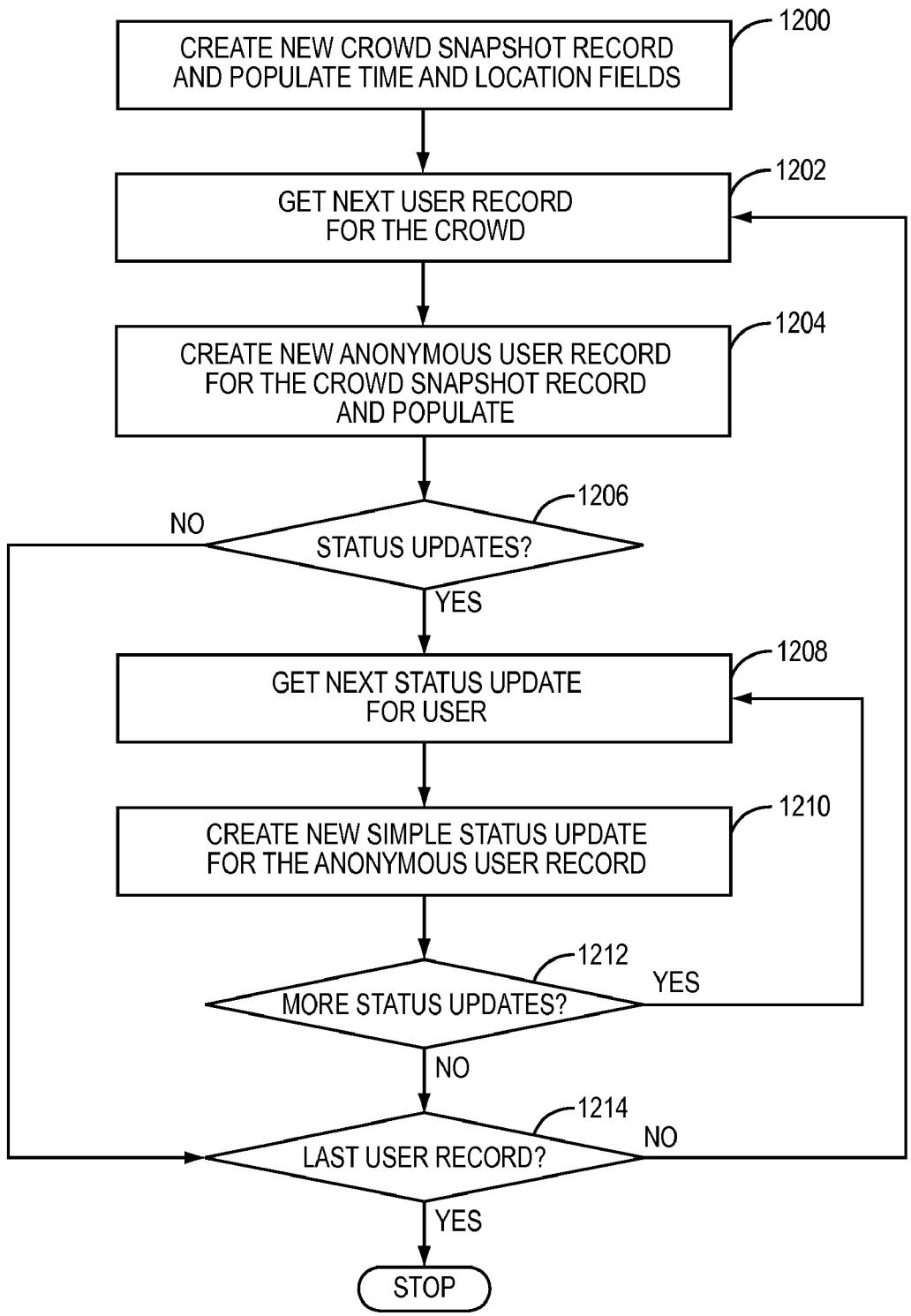
FIG. 6 illustrates a process for creating a crowd snapshot according to one embodiment of the present disclosure.

FIG. 6 illustrates step 1106 of FIG. 5 in more detail according to one embodiment of the present disclosure. Specifically, FIG. 6 is directed to an embodiment where status updates are proactively sent from the status updating service 12 to the crowd server 20 and stored by the crowd server 20. However, the present disclosure is not limited thereto. As illustrated, in order to create a crowd snapshot for a crowd, the crowd analyzer 88 first creates a new crowd snapshot record 100 for the crowd and populates the center field, the North East corner field, and the South West corner field of the new crowd snapshot record 100 with corresponding values from the crowd record 96 of the crowd (step 1200). The crowd analyzer 88 gets the next user record 98 from the list of user records for the crowd (step 1202) and creates a new anonymous user record 106 for the list of anonymous user records for the crowd snapshot record 100, where the anonymous user record 106 is an anonymized version of the user record 98 (step 1204).

Next, the crowd analyzer 88 determines whether the user 16 represented by the user record 98 has sent any status updates since the immediately preceding crowd snapshot for the crowd was created (step 1206). If not, the process proceeds to step 1214. Otherwise, the crowd analyzer 88 gets the next status update for the user 16 represented by the user record 98 (step 1208) and creates a corresponding simple status update record 108 in the list of updates stored in the anonymous user record 106 (step 1210). The crowd analyzer 88 then determines whether there are more status updates to be processed for the user 16 (step 1212). If so, the process returns to step 1208 and is repeated for the next status update for the user 16. Otherwise, the crowd analyzer 88 determines whether the last user record 98 in the list of user records for the crowd has been processed (step 1214). If not, the process returns to step 1202 and is repeated for the next user record 98 in the list of user records for the crowd. Once all of the user records 98 in the list of user records for the crowd have been processed, the process ends. Before proceeding, it should be noted that while the discussion of the crowd server 20 above focuses on embodiments where anonymization is performed, the present disclosure is not limited thereto. In another embodiment, the crowd server 20 forms and tracks crowds of users without anonymizing the user records and/or status updates stored in association with the crowd snapshots.

Figure 7:
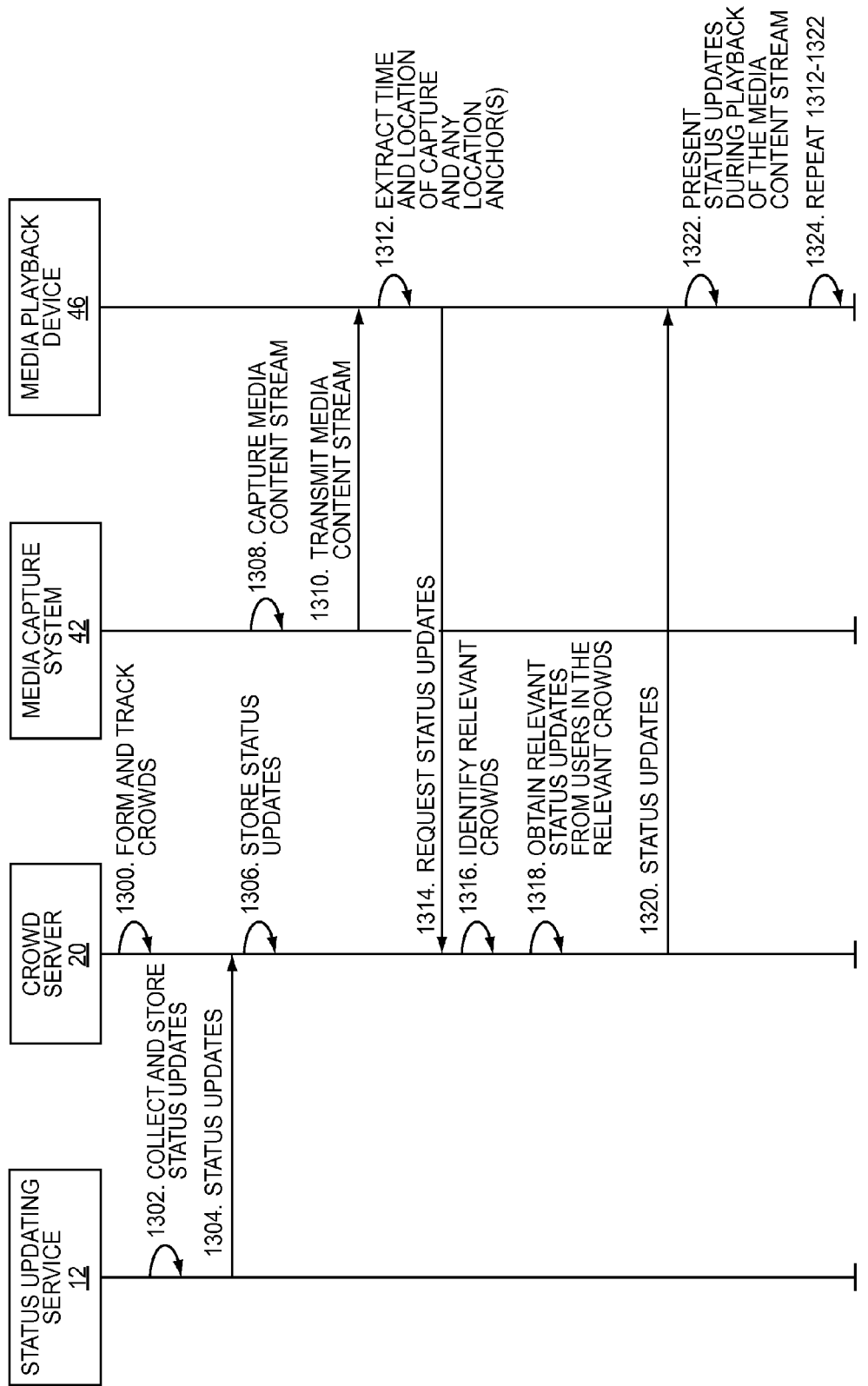
FIG. 7 illustrates the operation of the system of FIGS. 1A and 1B according to a first embodiment of the present disclosure.

Now, the discussion turns to the operation of the system 10 of FIGS. 1A and 1B. FIG. 7 illustrates the operation of the system 10 of FIGS. 1A and 1B according to a first embodiment of the present disclosure. As illustrated, the crowd server 20 forms and tracks crowds of users 16 (step 1300). For this discussion, it is assumed that the crowd formation and tracking process described above with respect to FIGS. 2-6 is used. However, the present disclosure is not limited thereto. Other crowd formation and tracking processes may be used. It should also be noted that the crowd formation and tracking process is an iterative and continual process that is performed by the crowd server 20.

The status updating service 12 collects status updates from the users 16 (step 1302). In this embodiment, the status updating service 12 sends the status updates for the users 16 to the crowd server 20 (step 1304). More specifically, the users 16 that desire for their status updates to be sent to the crowd server 20 may configure their user accounts at the status updating service 12 to instruct the status updating service 12 to forward their status updates to the crowd server 20. Note that not all of the users 16 may desire for their status updates to be sent to the crowd server 20. It should also be noted that the collection of status updates from the users 16 by the status updating service 12 and the subsequent sending of the status updates from the status updating service 12 to the crowd server 20 is an iterative and continual process. Upon receiving the status updates of the users 16 from the status updating service 12, the crowd server 20 stores the status updates in corresponding status update records 104 in the datastore 94 of the crowd server 20 (step 1306).

Figures 8A, 8B:
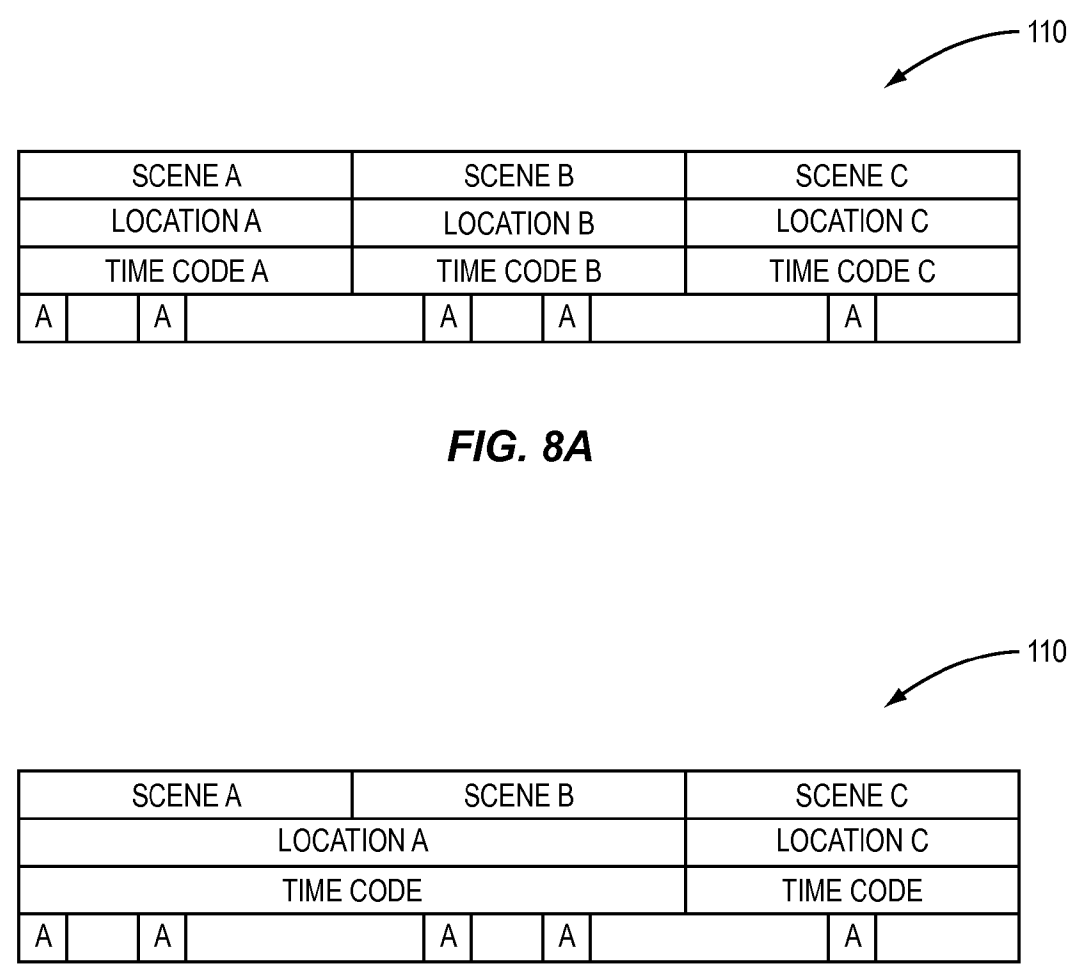

The media capture system 42 captures a media content stream (step 1308). The media content stream is encoded with times of capture of corresponding segments of the media content stream and, in some embodiments, locations of capture of corresponding segments of the media content stream. In addition, as discussed below, the media content stream may be encoded with one or more anchors. FIGS. 8A and 8B illustrate a portion of an exemplary media content stream 110 captured and encoded by the media capture system 42. As illustrated in FIG. 8A, the media content stream 110 is a video content stream and includes a number of segments, which in this embodiment are scenes. For each scene, the media content stream includes a location of capture and a time of capture (i.e., time code). The time of capture may identify a time at which capture of the corresponding segment began, a time period over which the corresponding segment was captured, or the like. In addition, in this embodiment, the media content stream also includes a number of anchors, which are denoted by "A"s in FIG. 8A. The anchors define locations, other than the location of capture, that are relevant to the corresponding segments of the media content stream 110. These locations are also referred to herein as location anchors. For example, if the media content stream 110 is a video stream, the anchors may define locations associated with persons appearing in the media content stream 110 (e.g., hometown of an athlete appearing in the media content stream 110). The anchors may also include anchor times, which are times that are different than the time of capture.

The anchors may be automatically inserted by, for example, the media capture system 42 by analyzing the audio content of the media content stream 110 for references to locations and then inserting corresponding anchors. Alternatively, the anchors may be manually inserted by a person operating or otherwise associated with the media capture system 42. As illustrated in FIG. 8B, adjacent segments of the media content stream 110 may have the same time of capture and location of capture information. This may be beneficial where two adjacent segments in the media content stream 110 are captured at the same location. Before returning to FIG. 7, it should be noted that the time and location of capture and the anchors are not necessarily encoded into the media content stream 110. Alternatively, the time and location of capture and the anchors may be provided separately via the same or a separate communication channel.

Returning to FIG. 7, the captured media content stream is transmitted directly or indirectly to the media playback device 46 (step 1310). The broadcast reception and playback function 64 of the media playback device 46 extracts the time of capture and, in some embodiments, the location of capture of a segment of the media content stream (step 1312). In addition, any anchors for the segments of the media content stream may be extracted. The time of capture and, in some embodiments, the location of capture and/or anchors extracted for the segment of the media content stream are then provided to the status update display function 66 of the media playback device 46. The status update display function 66 of the media playback device 46 then sends a request for status updates to the crowd server 20 (step 1314). The request includes the time of capture of the segment of the media content stream and, in some embodiments, the location of capture and/or any anchors extracted for the segment of the media content stream. In some embodiments, the request also includes a user profile of the user 68 of the media playback device 46.

Upon receiving the request for status updates, the crowd server 20 identifies one or more relevant crowds (step 1316). In one embodiment, the one or more relevant crowds include one or more crowds located in proximity to the location of capture of the segment of the media content stream at the time of capture of the segment of the media content stream. In one embodiment, a crowd is in proximity to the location of capture if the center of the crowd is located within a predefined distance from the location of capture. Further, if the time of capture is defined as a single point in time (e.g., Jun. 12, 2010 at 12:17 pm EST), a crowd is located in proximity to the location of capture at the time of capture if the crowd was located in proximity to the location of capture at the defined single point in time. This may be determined based on, in this embodiment, the location of the crowd recorded for the crowd at a time closest to the time of capture of the segment of the media content stream. Alternatively, if the time of capture is defined as a period of time, a crowd is located in proximity to the location of capture at the time of capture if the crowd was located in proximity to the location of capture during that period of time.

In addition or alternatively, the one or more relevant crowds may include one or more crowds located in proximity to the location of capture of the segment of the media content stream at the time of capture of the media content stream and that sufficiently match the user profile of the user 68 of the media playback device 46. As used herein, a crowd sufficiently matches the user profile of the user 68 if the crowd matches the user profile of the user 68 to at least a predefined threshold degree. More specifically, in one embodiment, the aggregation engine 90 compares the user profiles of the users 16 in a crowd to the user profile of the user 68 of the media playback device 46 to determine a number of matching interests, or keywords. The number of matching interests, which may also be referred to herein as a number of user matches, may then be compared to a predetermined threshold. If the number of matching interests is greater than the predetermined threshold, then the crowd matches the user profile of the user 68 to at least the predefined threshold degree. In another embodiment, the aggregation engine 90 may determine the number of user matches in the crowd for each interest, or keyword, in the user profile of the user 68. The crowd may then be determined to sufficiently match the user profile of the user 68 if, for example, a weighted average of the number of user matches for the interests in the user profile of the user 68 is greater than a predefined threshold. In yet another embodiment, rather than using the number of matching interests or the number of user matches in the aggregate or for each individual interest in the user profile of the user 68, the aggregation engine 90 may determine whether the crowd sufficiently matches the user profile of the user 68 based on a ratio of the number of users 16 in the crowd that have at least one interest in common with the user 68 to a total number of users 16 in the crowd or a ratio of the number of matching users 16 to a total number of users 16 in the crowd for each interest in the user profile of the user 68.

The one or more relevant crowds may additionally or alternatively include one or more crowds that sufficiently match the user profile of the user 68 of the media playback device 46 regardless of the location of the crowds. Still further, for each anchor defined for the segment if any, the one or more relevant crowd may additionally or alternatively include one or more crowds that were located in proximity to the anchor location defined by the anchor at either the time of capture of the media content stream or, if defined, the anchor time for the anchor.

The crowd server 20 then obtains relevant status updates that were sent from the users 16 in the one or more relevant crowds (step 1318). The relevant status updates include status updates sent in temporal proximity to the time of capture of the segment of the media content stream from the users 16 in the one or more relevant crowds. In one embodiment, the time of capture is defined as a particular point in time, and a status update is sent in temporal proximity to the time of capture if the status update was sent within a time window having a predefined duration (e.g., two minutes) encompassing the particular point in time (e.g., centered at the particular point in time, starting at the particular point in time, or ending at the particular point in time). In another embodiment, the time of capture is defined as a period of time, and a status update is sent in temporal proximity to the time of capture if the status update was sent during the period of time. In addition, if anchors that identify an anchor location and anchor time have been defined for the segment of the media content stream, for each relevant crowd identified for those anchors, the relevant status updates include status updates sent in temporal proximity to the anchor time from the users 16 in the relevant crowd(s) located in proximity to the anchor location at the anchor time.

In this embodiment, the relevant status updates are obtained from the datastore 94 of the crowd server 20. Depending on the time of capture of the segment of the media content stream, the status updates may be stored in the status update records 104 of the users 16 currently in the one or more relevant crowds or in the simple status update records 108 of the anonymous user records 106 for crowd snapshots captured for the one or more relevant crowds at or near the time of capture of the segment of the media content stream. The crowd server 20 returns the relevant status updates obtained in step 1318 to the media playback device 46 (step 1320). The crowd server 20 may return only the bodies of the status updates from the corresponding status update or simple status update records 104 or 108. Alternatively, the crowd server 20 may return the bodies of the status updates plus additional information from the corresponding status update or simple status update records 104 or 108. For example, if the names of the users 16 that sent the status updates are available, the status updates returned by the crowd server 20 may include both the names of the users 16 and the status update bodies and, optionally, the locations of the users 16 or the corresponding crowds at the time that the status updates were sent by the users 16.

The media playback device 46 then presents the relevant status updates during playback of the media content stream and, preferably, during playback of the corresponding segment of the media content stream (step 1322). In one embodiment, the status updates may be prioritized based on, for example, the users 16 that sent the status updates, the location of the users 16 at the time of sending the status updates (e.g., prioritized based on closeness to the location of capture), the time at which the status updates were sent by the users 16 (e.g., prioritize based on temporal proximity to the time of capture), degree of similarity between the user profile of the user 68 of the media playback device 46 and the user profiles of the users 16 that sent the status updates or the user profiles of the crowds from which the status updates originated, status update type (e.g., text, image, video, or audio), feedback from the user 68, maturity rating (e.g., PG, R, etc.), subject matter of the status updates which may be indicated by tags associated with the status updates, or the like. Higher priority status updates may be given priority during presentation by, for example, positioning the higher priority status updates at the top of a list of the status updates presented by the media playback device 46. Further, lower priority status updates may not be presented at all. At this point, in this embodiment, steps 1312 through 1322 are repeated to obtain and present status updates for additional segments of the media content stream (step 1324).

When presenting the relevant status updates for multiple segments of the media content stream, the relevant status updates may be sorted based on one or more criteria. The criteria used for sorting may be, for example, media content stream segment, location of capture boundaries in the media content stream, or time of capture boundaries in the media content stream. Thus, for example, when presenting the relevant status updates, the relevant status updates may be presented by segment. Alternatively, if the same location of capture and/or time of capture is applied to multiple segments of the media content stream (e.g., FIG. 8B), the relevant status updates may be stored by location of capture boundaries or time of capture boundaries. Thus, for example, if a location of capture encoded into the media content stream applies to two adjacent segments of the media content stream, then the relevant status updates obtained for both of those segments may be presented together. Note that sorting may naturally occur in the embodiment where the relevant status updates are obtained on a segment by segment basis as described above. However, in an alternative embodiment, the request for status updates may include the time of capture, location of capture, and any anchors for multiple segments and possibly all segments of the media content stream. The relevant status updates returned in response to this request may be sorted by segment, time of capture boundaries, or location of capture boundaries.

In the embodiment of FIG. 7, the media playback device 46 extracts the time and location of capture and any anchors from the media content stream in real-time as the media content stream is received and played by the media playback device 46. As such, buffering of the media content stream may be desired in order to delay playback of the media content stream by an amount of time that is sufficient to allow the media playback device 46 to obtain the relevant status updates from the crowd server 20 for presentation during the corresponding segments of the media content stream. The amount of delay provided by the buffering may be statically defined or dynamically controlled by the media playback device 46.

Note that while the embodiment of FIG. 7 is an embodiment where the status updates are obtained and presented in real-time as the media content stream is received and played, the present disclosure is not limited thereto. In another embodiment, the media playback device 46 may be a Digital Video Recorder (DVR) or similar device that operates to receive and record the media content stream for subsequent playback. In this case, the media playback device 46 may store the media content stream prior to or after extracting the time and location of capture and any anchors for the segments of the media content stream. The media playback device 46 may then request status updates for the segments of the media content stream during playback. Alternatively, the media playback device 46 may obtain status updates in real-time as the segments of the media content stream are received and store the status updates such that the status updates are available for presentation during subsequent playback(s) of the media content stream. As another alternative, the media playback device 46 may receive the media content stream and extract the time of capture, location of capture, and any anchors either as the media content stream is received or at some time after receiving and storing the media content stream. The media playback device 46 may then obtain the status updates relevant to the segments of the media content stream sometime before playback of the media content stream.

Figure 9:
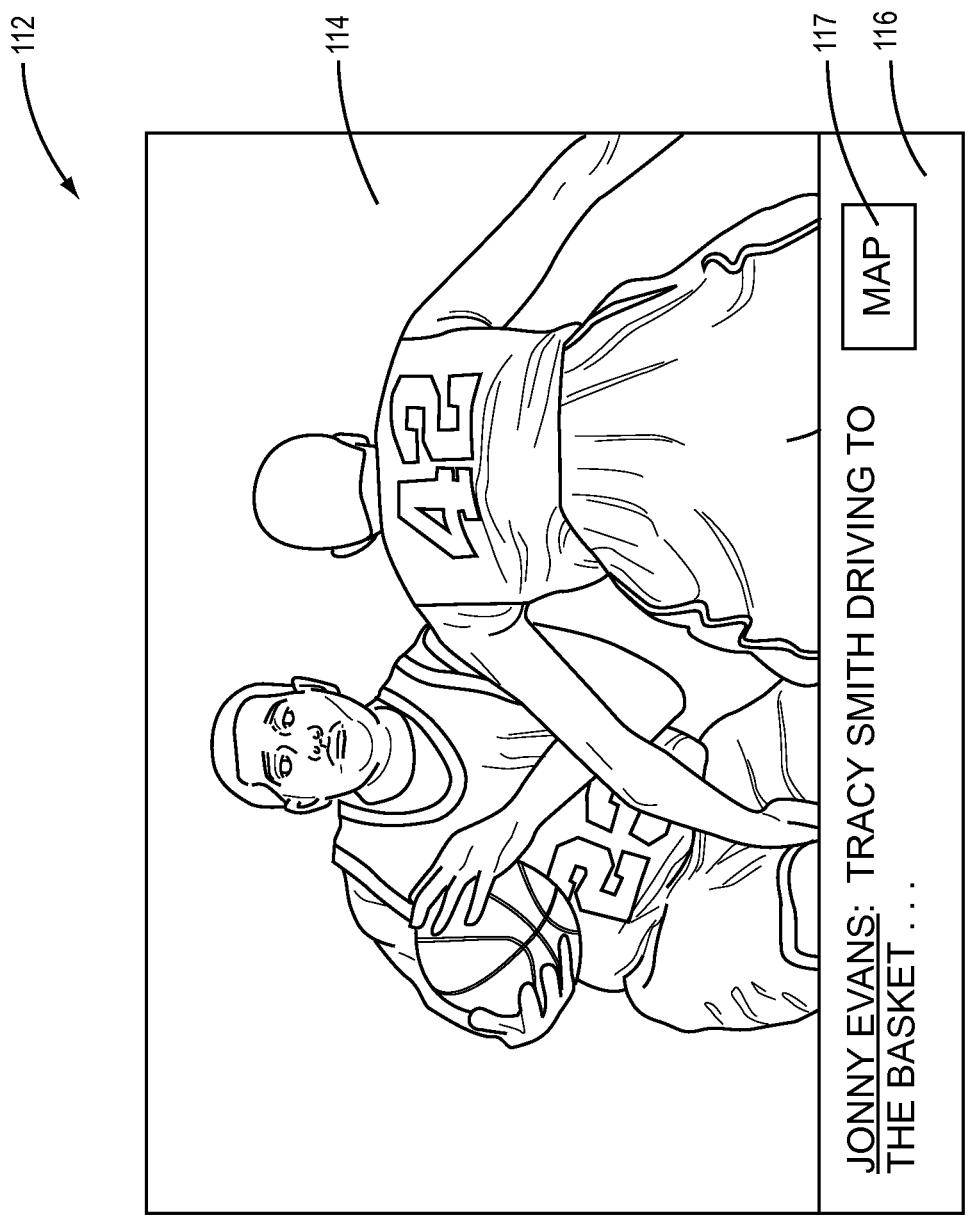
FIG. 9 illustrates an exemplary screenshot of a media content stream wherein status updates are presented in association with the media content according to one embodiment of the present disclosure.

FIG. 9 is an exemplary screenshot 112 of the presentation of status updates obtained for a segment of a media content stream according to one embodiment of the present disclosure. As illustrated, the media content stream is presented in a media content display area 114, and the status updates(s) are presented in a status update display area 116. While not illustrated, multiple status updates may be presented at the same time and optionally prioritized and/or sorted as described above. The status update display area 116 may be configured to display a single status update at a time (e.g., sequence of the highest priority status update for the current segment) or to display multiple status updates at a time. In addition, the exemplary screenshot 112 may include a map area 117 for displaying a map that shows the location of capture of the current segment of the media content stream and locations of the users 16 or crowds from which the displayed status updates originated. In this particular example, the map area 117 is intended to represent an arena containing a basketball court.

In another embodiment, the user 68 of the media playback device 46 is able to zoom in and out on the map area 117. Zooming in may act to limit the status updates displayed to those status updates originating from the zoom area. The zoom area is a portion of the map area 117 that is zoomed in upon. This may be accomplished by, for example, filtering the status updates received from the status updating service 12 such that only those status updates originating within the zoom area are displayed. Alternatively, only those status updates originating from the zoom area may be requested from the status updating service 12. The map area 117 may also be configured to contain a number of predefined user selectable interest areas. Interest areas are defined by geographic boundaries, and are intended to define geographic areas of common interest. In our example of the basketball arena, interest areas may include the home and away benches where the players and coaches sit, for example. Once the user 68 has selected one or more of the predefined user selectable interest areas, the status updates received from the status updating service 12 may be filtered such that only those status updates originating from the selected interest area(s) are displayed. Alternatively, only those status updates originating from the selected interest area(s) may be requested from the status updating service 12.

Figure 10:
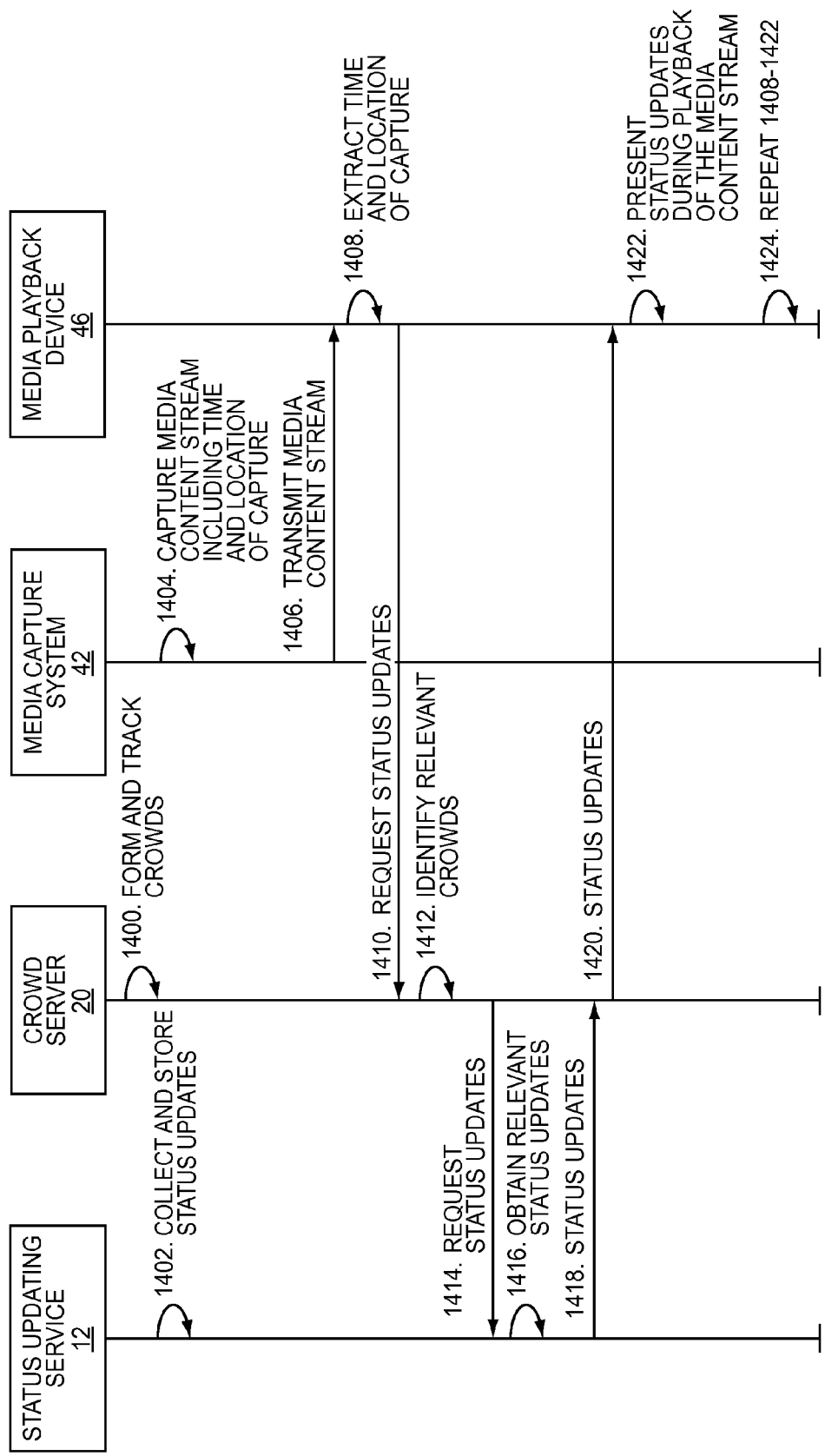
FIG. 10 illustrates the operation of the system of FIGS. 1A and 1B according to a second embodiment of the present disclosure.

FIG. 10 illustrates the operation of the system 10 of FIGS. 1A and 1B according to a second embodiment of the present disclosure. This embodiment is similar to that described above with respect to FIG. 7. However, in this embodiment, the status updates are not proactively sent from the status updating service 12 to the crowd server 20. Rather, the crowd server 20 requests status updates from the status updating service 12 as needed. More specifically, as illustrated, the crowd server 20 forms and tracks crowds of users (step 1400). For this discussion, it is assumed that the crowd formation and tracking process described above with respect to FIGS. 2-6 is used. However, the present disclosure is not limited thereto. Other crowd formation and tracking processes may be used. It should also be noted that the crowd formation and tracking process is an iterative and continual process that is performed by the crowd server 20. The status updating service 12 collects status updates from the users 16 (step 1402). The collection of status updates from the users 16 by the status updating service 12 is an iterative and continual process.

The media capture system 42 captures a media content stream (step 1404). The media content stream is encoded with times of capture of corresponding segments of the media content stream and, in some embodiments, locations of capture of corresponding segments of the media content stream. In addition, the media content stream may be encoded with one or more anchors, as described above. Again, it should be noted that the time and location of capture and the anchors are not necessarily encoded into the media content stream. Alternatively, the time and location of capture and the anchors may be provided separately via the same or a separate communication channel.

The media capture system 42 transmits the captured media content stream directly or indirectly to the media playback device 46 (step 1406). The broadcast reception and playback function 64 of the media playback device 46 extracts the time of capture and, in some embodiments, the location of capture of a segment of the media content stream (step 1408). In addition, any anchors for the segments of the media content stream may be extracted. The time of capture and, in some embodiments, the location of capture and/or anchors extracted for the segment of the media content stream are then provided to the status update display function 66 of the media playback device 46. The status update display function 66 of the media playback device 46 then sends a request for status updates to the crowd server 20 (step 1410). The request includes the time of capture of the segment of the media content stream and, in some embodiments, the location of capture and/or any anchors extracted for the segment of the media content stream. In some embodiments, the request also includes the user profile of the user 68 of the media playback device 46.

Upon receiving the request for status updates, the crowd server 20 identifies one or more relevant crowds (step 1412). In one embodiment, the one or more relevant crowds include one or more crowds located in proximity to the location of capture of the segment of the media content stream at the time of capture of the segment of the media content stream. In one embodiment, a crowd is in proximity to the location of capture if the center of the crowd is located within a predefined distance from the location of capture. Further, if the time of capture is defined as a single point in time (e.g., Jun. 12, 2010 at 12:17 pm EST), a crowd is located in proximity to the location of capture at the time of capture if the crowd was located in proximity to the location of capture at the defined single point in time. This may be determined based on, in this embodiment, the location of the crowd recorded for the crowd at a time closest to the time of capture of the segment of the media content stream. Alternatively, if the time of capture is defined as a period of time, a crowd is located in proximity to the location of capture at or near the time of capture if the crowd was located in proximity to the location of capture during that period of time.

In addition or alternatively, the one or more relevant crowds may include one or more crowds located in proximity to the location of capture of the segment of the media content stream at the time of capture of the media content stream and that sufficiently match the user profile of the user 68 of the media playback device 46. As used herein, a crowd sufficiently matches the user profile of the user 68 if the crowd matches the user profile of the user 68 to at least predefined threshold degree. More specifically, in one embodiment, the aggregation engine 90 compares the user profiles of the users 16 in a crowd to the user profile of the user 68 of the media playback device 46 to determine a number of matching interests, or keywords. The number of matching interests, which may also be referred to herein as a number of user matches, may then be compared to a predetermined threshold. If the number of matching interests is greater than the predetermined threshold, then the crowd matches the user profile of the user 68 to at least the predefined threshold degree. In another embodiment, the aggregation engine 90 may determine the number of user matches in the crowd for each interest, or keyword, in the user profile of the user 68. The crowd may then be determined to sufficiently match the user profile of the user 68 if, for example, a weighted average of the number of user matches for the interest in the user profile of the user 68 is greater than a predefined threshold. In yet another embodiment, rather than using the number of matching interests or the number of user matches in the aggregate or for each individual interest in the user profile of the user 68, the aggregation engine 90 may determine whether the crowd sufficiently matches the user profile of the user 68 based on a ratio of the number of users in the crowd that have at least one interest in common with the user 68 to a total number of users 16 in the crowd or a ratio of the number of matching users 16 to a total number of users 16 in the crowd for each interest in the user profile of the user 68.

The one or more relevant crowds may additionally or alternatively include one or more crowds that sufficiently match the user profile of the user 68 of the media playback device 46 regardless of the location of the crowds. Still further, if an anchor is defined for the segment, the one or more relevant crowd may additionally or alternatively include one or more crowds that were located in proximity to the anchor location defined by the anchor for the segment of the media content stream at the time of capture of the media content stream or, if defined, at the anchor time defined by the anchor.

The crowd server 20 then sends a request to the status updating service 12 for relevant status updates (step 1414). The status updating service 12 then processes the request to obtain the relevant status updates (step 1416). In one embodiment, the request includes information identifying the users 16 in the one or more relevant crowds located in proximity to the location of capture of the segment of the media content stream at the time of capture of the segment of the media content stream and the time of capture. As such, in this embodiment, the status updating service 12 obtains status updates received from the users 16 identified in the request in temporal proximity to the time of capture of the segment of the media content stream. Similarly, if an anchor identifying both an anchor location and anchor time is defined for the segment, the request may include information identifying the users 16 in the one or more relevant crowds located in proximity to the anchor location at the anchor time and the anchor time. The relevant status updates may then include status updates sent by the users 16 in these relevant crowds in temporal proximity to the anchor time.

In another embodiment, the crowd information included in the request sent to the status updating service 12 includes the locations of the one or more relevant crowds (e.g., the crowd centers, the North East corners, and/or the South West corners of the one or more relevant crowds) at the time of capture of the segment of the media content stream. This may be the case in embodiments where, for example, identifying the users 16 in the one or more relevant crowds at the time of capture of the segment of the media content stream may not be available due to anonymization. In this embodiment, the request is received via the GEO API 30 of the real-time search engine 24 of the status updating service 12. Upon receiving the request, the real-time search engine 24 of the status updating service 12 obtains, from the status updates repository 28, status updates sent in temporal proximity to the time of capture of the segment of the media content stream from the users 16 located in proximity to the locations of the one or more relevant crowds at the time of capture of the segment of the media content stream.

The users 16 located in proximity to the locations of the one or more relevant crowds at the time of capture of the segment of the media content stream may be identified differently depending on the particular information used to define the locations the one or more relevant crowds. If the locations of the one or more relevant crowds are defined as the centers of the one or more relevant crowds, then the users 16 located in proximity to the one or more relevant crowds at the time of capture of the segment of the media content stream are the users 16 that are located within predefined bounding regions centered at or otherwise encompassing the centers of the one or more relevant crowds (e.g., the users 16 that are located within a predefined distance from the centers of the one or more relevant crowds) at the time of capture of the segment of the media content stream. If the location identifying the locations of the crowds is information defining bounding boxes or regions for the crowds, then the users 16 located in proximity to the locations of the crowds at the time of capture of the segment of the media content stream are the users 16 located within the bounding boxes or regions for the one or more relevant crowds at the time of capture of the segment of the media content stream.

In a similar manner, relevant status updates may be obtained for relevant crowds identified for anchors that identify both anchor locations and anchor times. More specifically, the crowd information included in the request sent to the status updating service 12 may include, for each anchor, the location(s) of relevant crowd(s) (e.g., the crowd centers, the North East corners, and/or the South West corners of the one or more relevant crowds) identified for the anchor location at the time of capture of the segment of the media content stream or, if defined, the anchor time for the anchor. In this embodiment, the request is received via the GEO API 30 of the real-time search engine 24 of the status updating service 12. Upon receiving the request, the real-time search engine 24 of the status updating service 12 obtains, from the status updates repository 28, status updates sent in temporal proximity to the time of capture of the segment of the media content stream or, if defined, the anchor time of the anchor from the users 16 located in proximity to the location(s) of the relevant crowd(s) identified for the anchor at the time of capture of the segment of the media content stream or, if defined, the anchor time defined by the anchor.

The status updating service 12 returns the relevant status updates obtained in step 1416 to the crowd server 20 (step 1418), which in turn returns the relevant status updates to the media playback device 46 (step 1420). The media playback device 46 then presents the relevant status updates during playback of the media content stream and, preferably, during playback of the corresponding segment of the media content stream (step 1422). In one embodiment, the relevant status updates may be prioritized based on, for example, the users 16 that sent the relevant status updates, the location of the users 16 at the time of sending the relevant status updates (e.g., prioritized based on closeness to the location of capture), the time at which the relevant status updates were sent by the users 16 (e.g., prioritize based on temporal proximity to the time of capture), degree of similarity between the user profile of the user 68 of the media playback device 46 and the user profiles of the users 16 that sent the relevant status updates or the user profiles of the crowds from which the relevant status updates originated, status update type (e.g., text, image, video, or audio), feedback from the user 68, maturity rating (e.g., PG, R, etc.), subject matter of the relevant status updates which may be indicated by tags associated with the relevant status updates, or the like. Higher priority status updates may be given priority during presentation by, for example, positioning the higher priority status updates at the top of a list of the relevant status updates presented by the media playback device 46. Further, lower priority status updates may not be presented at all. At this point, in this embodiment, steps 1408 through 1422 are repeated to obtain and present relevant status updates for additional segments of the media content stream (step 1424).

When presenting the relevant status updates for multiple segments of the media content stream, the relevant status updates may be sorted based on one or more criteria. The criteria used for sorting may be, for example, media content stream segment, location of capture boundaries in the media content stream, or time of capture boundaries in the media content stream. Thus, for example, when presenting the relevant status updates, the relevant status updates may be presented by segment. Alternatively, if the same location of capture and/or time of capture is applied to multiple segments of the media content stream (e.g., FIG. 8B), the relevant status updates may be stored by location of capture boundaries or time of capture boundaries. Thus, for example, if a location of capture encoded into the media content stream applies to two adjacent segments of the media content stream, then the relevant status updates obtained for both of those segments may be presented together. Note that sorting may naturally occur in the embodiment where the relevant status updates are obtained on a segment by segment basis as described above. However, in an alternative embodiment, the request for status updates may include the time of capture, location of capture, and any anchors for multiple segments and possibly all segments of the media content stream. The relevant status updates returned in response to this request may be sorted by segment, time of capture boundaries, or location of capture boundaries.

In the embodiment of FIG. 10, the media playback device 46 extracts the time and location of capture and any anchors from the media content stream in real-time as the media content stream is received and played by the media playback device 46. As such, buffering of the media content stream may be desired in order to delay playback of the media content stream by an amount of time that is sufficient to allow the media playback device 46 to obtain the relevant status updates from the crowd server 20 for presentation during the corresponding segments of the media content stream. The amount of delay provided by the buffering may be statically defined or dynamically controlled by the media playback device 46.

Note that while the embodiment of FIG. 10 is an embodiment where the status updates are obtained and presented in real-time as the media content stream is received and played, the present disclosure is not limited thereto. In another embodiment, the media playback device 46 may be a DVR or similar device that operates to receive and record the media content stream for subsequent playback. In this case, the media playback device 46 may store the media content stream prior to or after extracting the time and location of capture and any anchors for the segments of the media content stream. The media playback device 46 may then request status updates for the segments of the media content stream during playback. Alternatively, the media playback device 46 may obtain status updates in real-time as the segments of the media content stream are received and store the status updates such that the status updates are available for presentation during subsequent playback(s) of the media content stream. As another alternative, the media playback device 46 may receive the media content stream and extract the time of capture, location of capture, and any anchors either as the media content stream is received or at some time after receiving and storing the media content stream. The media playback device 46 may then obtain the status updates relevant to the segments of the media content stream sometime before playback of the media content stream.

Figure 11:
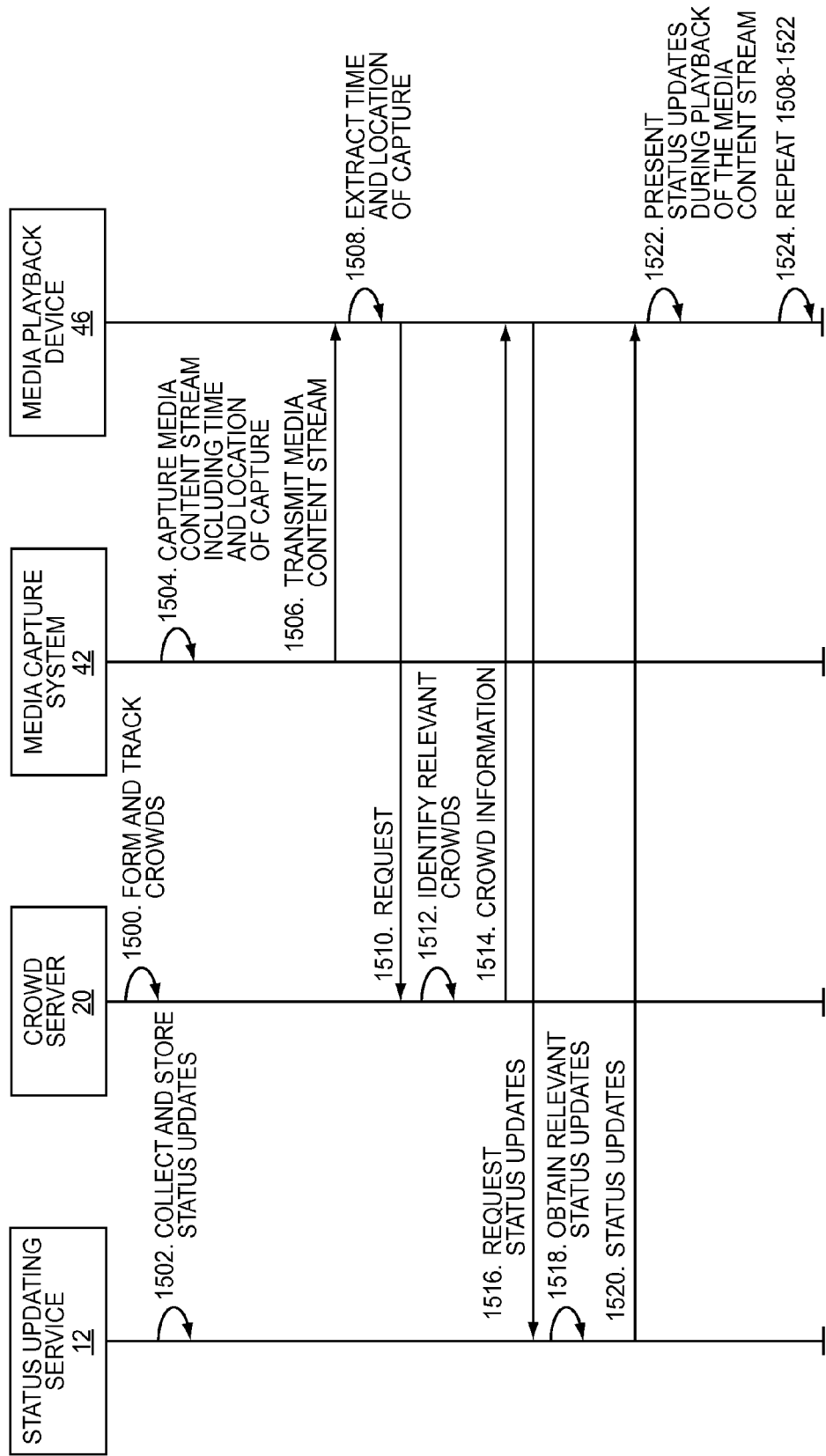
FIG. 11 illustrates the operation of the system of FIGS. 1A and 1B according to a third embodiment of the present disclosure.

FIG. 11 illustrates the operation of the system 10 of FIGS. 1A and 1B according to a third embodiment of the present disclosure. This embodiment is similar to that described above with respect to FIG. 10. However, in this embodiment, the crowd server 20 returns information regarding the one or more relevant crowds to the media playback device 46, and the media playback device 46 utilizes this information to request relevant status updates from the status updating service 12. Steps 1500 through 1512 are the same as steps 1400 through 1412 of FIG. 10. After step 1512, the crowd server 20 returns information regarding the one or more relevant crowds identified in step 1512 to the media playback device 46 (step 1514). The information regarding the one or more relevant crowds is also referred to herein as crowd information. In one embodiment, the crowd information includes information identifying the users 16 in the one or more relevant crowds at the time of capture of the segment of the media content stream. In addition, for any anchors for the segment that define both an anchor location and an anchor time, the crowd information may also include information identifying the users 16 in relevant crowd(s) identified for those anchor location(s) at the corresponding anchor time(s). In another embodiment, the crowd information includes information identifying the location of each of the one or more relevant crowds at the time of capture of the segment of the media content stream or the corresponding anchor time as is appropriate.

The status update display function 66 of the media playback device 46 then sends a request for status updates to the status updating service 12 (step 1516). The request includes the crowd information received from the crowd server 20. In response to receiving the request, the status updating service 12 obtains relevant status updates (step 1518). In one embodiment, the request includes information identifying the users 16 in the one or more relevant crowds located in proximity to the location of capture of the segment of the media content stream at the time of capture of the segment of the media content stream. As such, in this embodiment, the status updating service 12 obtains status updates sent in temporal proximity to the time of capture of the segment of the media content stream from the users 16 identified in the request. In addition, for each anchor defined for the segment if any, the request may include information identifying the users 16 in the one or more relevant crowds located in proximity to the anchor location at either the time of capture of the segment of the media content stream or the anchor time defined by the anchor depending on the particular implementation of the anchor. The status updating service 12 may then obtain status updates sent from the users 16 identified in the request that were sent in temporal proximity to the time of capture or the anchor time as appropriate.

In another embodiment, the crowd information included in the request sent to the status updating service 12 includes the locations of the one or more relevant crowds (e.g., the crowd centers, the North East corners, and/or the South West corners of the one or more relevant crowds) at the time of capture of the segment of the media content stream. This may be the case in embodiments where, for example, identifying the users 16 in the one or more relevant crowds at the time of capture of the segment of the media content stream may not be available due to anonymization. In this embodiment, the request is received via the GEO API 30 of the real-time search engine 24 of the status updating service 12. Upon receiving the request, the real-time search engine 24 of the status updating service 12 obtains, from the status updates repository 28, status updates sent in temporal proximity to the time of capture of the segment of the media content stream from the users 16 located in proximity to the locations of the one or more relevant crowds at the time of capture of the segment of the media content stream. In a similar manner, relevant status updates may be obtained for relevant crowds identified for anchors that identify both an anchor location and an anchor time.

The status updating service 12 returns the relevant status updates obtained in step 1518 to the media playback device 46 (step 1520). The status update display function 66 of the media playback device 46 then presents the relevant status updates during playback of the media content stream and, preferably, during playback of the corresponding segment of the media content stream (step 1522). In one embodiment, the relevant status updates may be prioritized based on, for example, the users 16 that sent the relevant status updates, the location of the users 16 at the time of sending the relevant status updates (e.g., prioritized based on closeness to the location of capture), the time at which the relevant status updates were sent by the users 16 (e.g., prioritize based on temporal proximity to the time of capture), degree of similarity between the user profile of the user 68 of the media playback device 46 and the user profiles of the users 16 that sent the relevant status updates or the user profiles of the crowds from which the relevant status updates originated, status update type (e.g., text, image, video, or audio), feedback from the user 68, maturity rating (e.g., PG, R, etc.), subject matter of the relevant status updates which may be indicated by tags associated with the relevant status updates, or the like. Higher priority status updates may be given priority during presentation by, for example, positioning the higher priority status updates at the top of a list of the status updates presented by the media playback device 46. Further, lower priority status updates may not be presented at all. At this point, in this embodiment, steps 1508 through 1522 are repeated to obtain and present relevant status updates for additional segments of the media content stream (step 1524).

When presenting the relevant status updates for multiple segments of the media content stream, the relevant status updates may be sorted based on one or more criteria. The criteria used for sorting may be, for example, media content stream segment, location of capture boundaries in the media content stream, or time of capture boundaries in the media content stream. Thus, for example, when presenting the relevant status updates, the relevant status updates may be presented by segment. Alternatively, if the same location of capture and/or time of capture is applied to multiple segments of the media content stream (e.g., FIG. 8B), the relevant status updates may be stored by location of capture boundaries or time of capture boundaries. Thus, for example, if a location of capture encoded into the media content stream applies to two adjacent segments of the media content stream, then the relevant status updates obtained for both of those segments may be presented together. Note that sorting may naturally occur in the embodiment where the relevant status updates are obtained on a segment by segment basis as described above. However, in an alternative embodiment, the request for status updates may include the time of capture, location of capture, and any anchors for multiple segments and possibly all segments of the media content stream. The relevant status updates returned in response to this request may be sorted by segment, time of capture boundaries, or location of capture boundaries.

In the embodiment of FIG. 11, the media playback device 46 extracts the time and location of capture and any anchors from the media content stream in real-time as the media content stream is received and played by the media playback device 46. As such, buffering of the media content stream may be desired in order to delay playback of the media content stream by an amount of time that is sufficient to allow the media playback device 46 to obtain the relevant status updates for presentation during the corresponding segments of the media content stream. The amount of delay provided by the buffering may be statically defined or dynamically controlled by the media playback device 46.

Note that while the embodiment of FIG. 11 is an embodiment where the status updates are obtained and presented in real-time as the media content stream is received and played, the present disclosure is not limited thereto. In another embodiment, the media playback device 46 may be a DVR or similar device that operates to receive and record the media content stream for subsequent playback. In this case, the media playback device 46 may store the media content stream prior to or after extracting the time and location of capture and any anchors for the segments of the media content stream. The media playback device 46 may then obtain status updates for the segments of the media content stream during playback. Alternatively, the media playback device 46 may obtain status updates in real-time as the segments of the media content stream are received and store the status updates such that the status updates are available for presentation during subsequent playback(s) of the media content stream. As another alternative, the media playback device 46 may receive the media content stream and extract the time of capture, location of capture, and any anchors either as the media content stream is received or at some time after receiving and storing the media content stream. The media playback device 46 may then obtain the status updates relevant to the segments of the media content stream sometime before playback of the media content stream.

Figure 12:
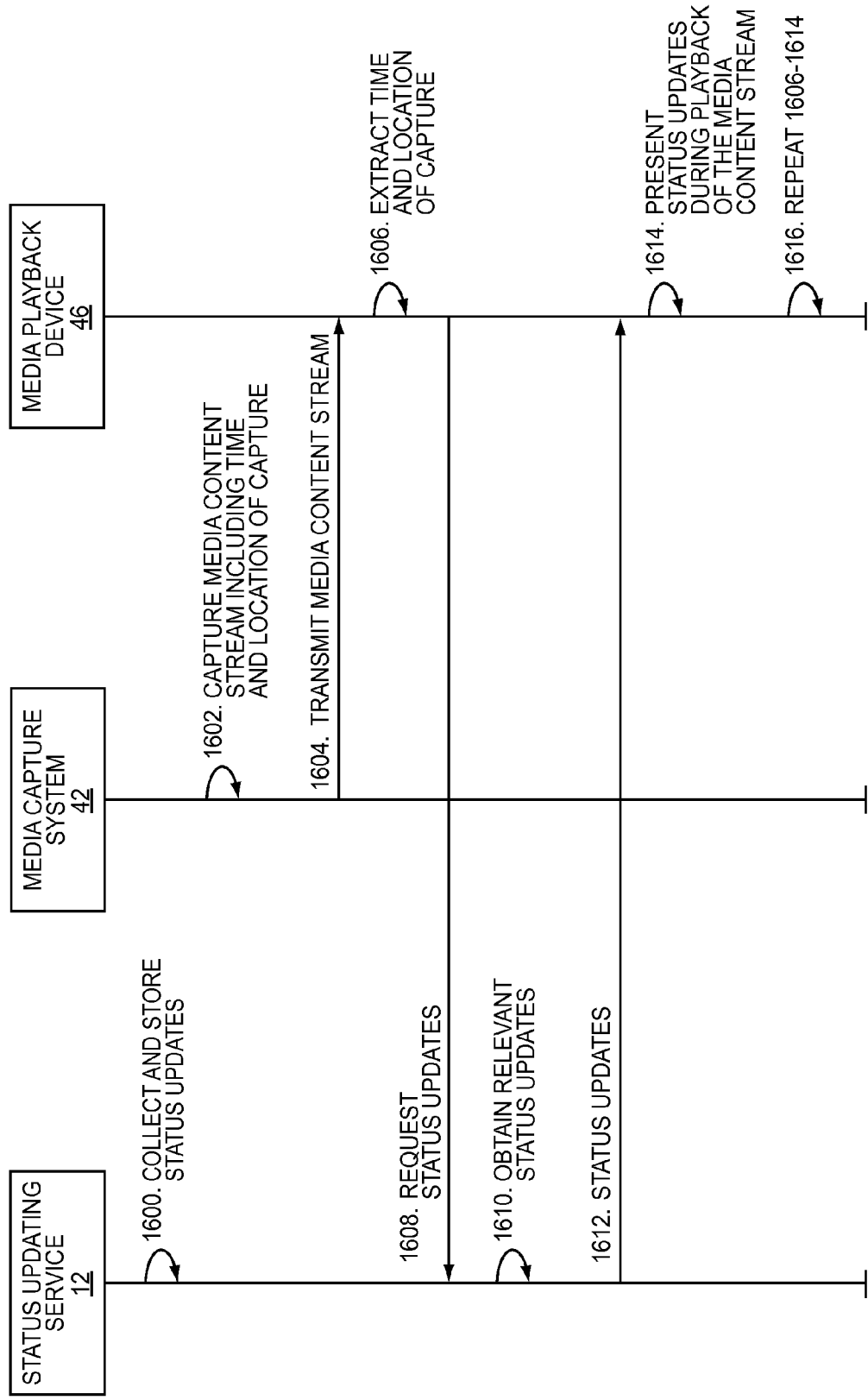
FIG. 12 illustrates the operation of the system of FIGS. 1A and 1B according to a fourth embodiment of the present disclosure.

FIG. 12 illustrates the operation of the system 10 of FIGS. 1A and 1B according to a fourth embodiment of the present disclosure. This embodiment is similar to those described above. However, in this embodiment, the media playback device 46 requests status updates directly from the status updating service 12. In this embodiment, the crowd server 20 is not utilized to obtain the status updates. More specifically, as illustrated, the status updating service 12 collects status updates from the users 16 (step 1600). The collection of status updates from the users 16 by the status updating service 12 is an iterative and continual process.

The media capture system 42 captures a media content stream (step 1602). The media content stream is encoded with times of capture of corresponding segments of the media content stream and, in some embodiments, locations of capture of corresponding segments of the media content stream. In addition, the media content stream may be encoded with one or more anchors, as described above. Again, it should be noted that the time and location of capture and the anchors are not necessarily encoded into the media content stream. Alternatively, the time and location of capture and the anchors may be provided separately via the same or a separate communication channel.

The media capture system 42 transmits the captured media content stream directly or indirectly to the media playback device 46 (step 1604). The broadcast reception and playback function 64 of the media playback device 46 extracts the time of capture and, in some embodiments, the location of capture of a segment of the media content stream (step 1606). In addition, any anchors for the segments of the media content stream may be extracted. The time of capture and, in some embodiments, the location of capture and/or anchors extracted for the segment of the media content stream are then provided to the status update display function 66 of the media playback device 46. The status update display function 66 of the media playback device 46 then sends a request for status updates to the status updating service 12 (step 1608). The request includes the time of capture of the segment of the media content stream and, in some embodiments, the location of capture and/or any anchors extracted for the segment of the media content stream. In some embodiments, the request also includes a profile of the user 68 of the media playback device 46.

Upon receiving the request for status updates, the status updating service 12 obtains relevant status updates (step 1610). In one embodiment, the relevant status updates include one or more status updates sent to the status updating service 12 in temporal proximity to the time of capture of the segment of the media content stream from one or more of the users 16 located in proximity to the location of capture of the segment of the media content stream at the time of capture of the segment of the media content stream. Thus, in other words, the one or more relevant status updates may include status updates sent from locations in proximity to the location of capture of the segment of the media content stream in temporal proximity to the time of capture of the segment of the media content stream. In one embodiment, a status update is determined to be sent from a location that is in proximity to the location of capture if the status update was sent from a location that is within a predefined distance from the location of capture. Further, if the time of capture is defined as a single point in time (e.g., Jun. 12, 2010 at 12:17 pm EST), a status update may be determined to be sent in temporal proximity to the time of capture if, for example, the status update was sent within a defined amount of time from the time of capture. Alternatively, if the time of capture is defined as a period of time, a status update is determined to have been sent in temporal proximity to the time of capture if, for example, the status update was sent during that period of time.

In addition or alternatively, the one or more relevant status updates may include one or more status updates sent in temporal proximity to the time of capture of the segment of the media content stream by one or more of the users 16 having user profiles that sufficiently match the user profile of the user 68 of the media playback device 46. As used herein, the user profile of a user 16 sufficiently matches the user profile of the user 68 if the user profile of the user 16 matches the user profile of the user 68 to at least predefined threshold degree. The predetermined threshold degree may be, for example, a threshold number of matching interests in the user profiles of the users 16 and 68 or a threshold ratio of the number of matching user interests to the total number of interests in the user profiles of the users 16 and 68. The relevant status updates may additionally or alternatively include one or more status updates sent in temporal proximity to the time of capture of the segment of the media content stream from one or more of the users 16 having user profiles that sufficiently match the user profile of the user 68 of the media playback device 46 and from locations in proximity to the location of capture of the segment of the media content stream.

Still further, for each anchor for the segment if any, the one or more relevant status updates may additionally or alternatively include status updates sent in temporal proximity to the time of capture or, if defined, the anchor time defined by the anchor from users 16 located in proximity to the anchor location at the time of sending the status updates. Similarly, for each anchor for the segment if any, the one or more relevant status updates may additionally or alternatively include status updates sent in temporal proximity to the time of capture or, if defined, the anchor time defined by the anchor from users 16 having user profiles that sufficiently match the user profile of the user 68 of the media playback device 46 located in proximity to the anchor location at the time of sending the status updates.

The status updating service 12 then returns the relevant status updates obtained in step 1610 to the media playback device 46 (step 1612). The media playback device 46 then presents the relevant status updates during playback of the media content stream and, preferably, during playback of the corresponding segment of the media content stream (step 1614). In one embodiment, the relevant status updates may be prioritized based on, for example, the users 16 that sent the relevant status updates, the location of the users 16 at the time of sending the relevant status updates (e.g., prioritized based on closeness to the location of capture), the time at which the relevant status updates were sent by the users 16 (e.g., prioritize based on temporal proximity to the time of capture), degree of similarity between the user profile of the user 68 of the media playback device 46 and the user profiles of the users 16 that sent the relevant status updates, status update type (e.g., text, image, video, or audio), feedback from the user 68, maturity rating (e.g., PG, R, etc.), subject matter of the relevant status updates which may be indicated by tags associated with the status updates, or the like. Higher priority status updates may be given priority during presentation by, for example, positioning the higher priority status updates at the top of a list of the status updates presented by the media playback device 46. Further, lower priority status updates may not be presented at all. At this point, in this embodiment, steps 1606 through 1614 are repeated to obtain and present relevant status updates for additional segments of the media content stream (step 1616).

Again, when presenting status updates for multiple segments of the media content stream, the status updates may be sorted based on one or more criteria. The criteria used for sorting may be, for example, media content stream segment, location of capture boundaries in the media content stream, or time of capture boundaries in the media content stream. Thus, for example, when presenting the relevant status updates, the relevant status updates may be presented by segment. Alternatively, if the same location of capture and/or time of capture may apply to multiple segments of the media content stream (e.g., FIG. 8B), the status updates may be stored by location of capture boundaries or time of capture boundaries. Thus, for example, if a location of capture encoded into the media content stream applies to two adjacent segments of the media content stream, then the status updates obtained for both of those segments may be presented together. Note that sorting may naturally occur in the embodiment where the relevant status updates are obtained on a segment by segment basis as described above. However, in an alternative embodiment, the request for status updates may the time of capture, location of capture, and any anchors for multiple segments and possibly all segments of the media content stream. The relevant status updates returned in response to this request may be sorted by segment, time of capture boundaries, or location of capture boundaries.

In the embodiment of FIG. 12, the media playback device 46 extracts the time and location of capture and any anchors from the media content stream in real-time as the media content stream is received and played by the media playback device 46. As such, buffering of the media content stream may be desired in order to delay playback of the media content stream by an amount of time that is sufficient to allow the media playback device 46 to obtain the relevant status updates for presentation during the corresponding segments of the media content stream. The amount of delay provided by the buffering may be statically defined or dynamically controlled by the media playback device 46.

Note that while the embodiment of FIG. 12 is an embodiment where the status updates are obtained and presented in real-time as the media content stream is received and played, the present disclosure is not limited thereto. In another embodiment, the media playback device 46 may be a DVR or similar device that operates to receive and record the media content stream for subsequent playback. In this case, the media playback device 46 may store the media content stream prior to or after extracting the time and location of capture and any anchors for the segments of the media content stream. The media playback device 46 may then request status updates for the segments of the media content stream during playback. Alternatively, the media playback device 46 may obtain status updates in real-time as the segments of the media content stream are received and store the status updates such that the status updates are available for presentation during subsequent playback(s) of the media content stream. As another alternative, the media playback device 46 may receive the media content stream and extract the time of capture, location of capture, and any anchors either as the media content stream is received or at some time after receiving and storing the media content stream. The media playback device 46 may then obtain the status updates relevant to the segments of the media content stream sometime before playback of the media content stream.

Figure 13:
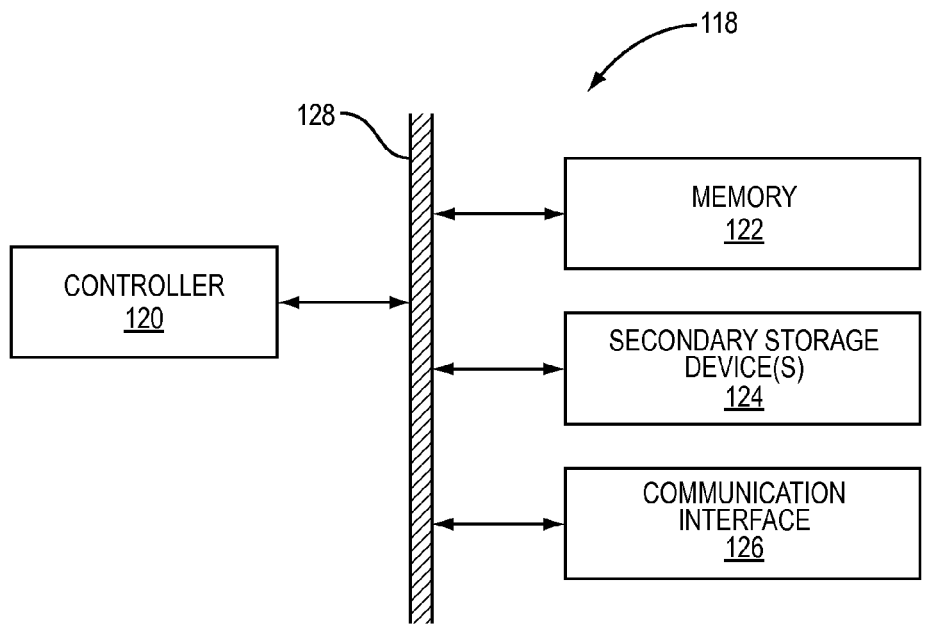
FIG. 13 is a block diagram of a server hosting the status updating service of FIGS. 1A and 1B according to one embodiment of the present disclosure.

FIG. 13 is a block diagram of a server 118 hosting the status updating service 12 of FIGS. 1A and 1B according to one embodiment of the present disclosure. As illustrated, the server 118 includes a controller 120 connected to memory 122, one or more secondary storage devices 124, and a communication interface 126 by a bus 128 or similar mechanism. The controller 120 is a microprocessor, digital Application Specific Integrated Circuit (ASIC), Field Programmable Gate Array (FPGA), or the like. In this embodiment, the controller 120 is a microprocessor, and the status updating service 12 is implemented in software and stored in the memory 122 for execution by the controller 120. Note, however, that the user accounts repository 26 and the status updates repository 28 may be stored in the one or more secondary storage devices 124. The secondary storage devices 124 are digital data storage devices such as, for example, one or more hard disk drives. The communication interface 126 is a wired or wireless communication interface that communicatively couples the server 118 to the network 18 (FIGS. 1A and 1B). For example, the communication interface 126 may be an Ethernet interface, local wireless interface such as a wireless interface operating according to one of the suite of IEEE 802.11 standards, or the like.

Figure 14:
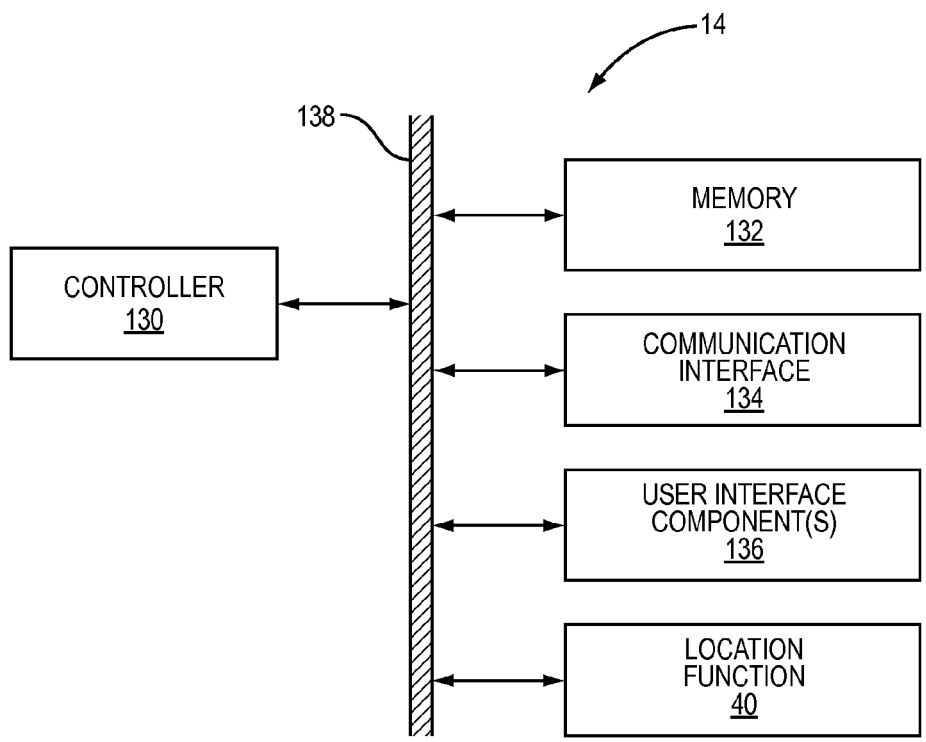
FIG. 14 is a block diagram of one of the mobile devices of FIGS. 1A and 1B according to one embodiment of the present disclosure.

FIG. 14 is a block diagram of one of the mobile devices 14 of FIGS. 1A and 1B according to one embodiment of the present disclosure. This discussion is equally applicable to the other mobile devices 14 of FIGS. 1A and 1B. As illustrated, the mobile device 14 includes a controller 130 connected to memory 132, a communication interface 134, one or more user interface components 136, and the location function 40 by a bus 138 or similar mechanism. The controller 130 is a microprocessor, digital ASIC, FPGA, or the like. In this embodiment, the controller 130 is a microprocessor, and the crowd client 34, the status updating application 36, and the clock 38 are implemented in software and stored in the memory 132 for execution by the controller 130. In this embodiment, the location function 40 is a hardware component such as, for example, a GPS receiver. The communication interface 134 is a wireless communication interface, or wireless network interface, that communicatively couples the mobile device 14 to the network 18 (FIGS. 1A and 1B). For example, the communication interface 134 may be a local wireless interface such as a wireless interface operating according to one of the suite of IEEE 802.11 standards, a mobile communications interface such as a cellular telecommunications interface, or the like. The one or more user interface components 136 include, for example, a touchscreen, a display, one or more user input components (e.g., a keypad), a speaker, or the like, or any combination thereof.

Figure 15:
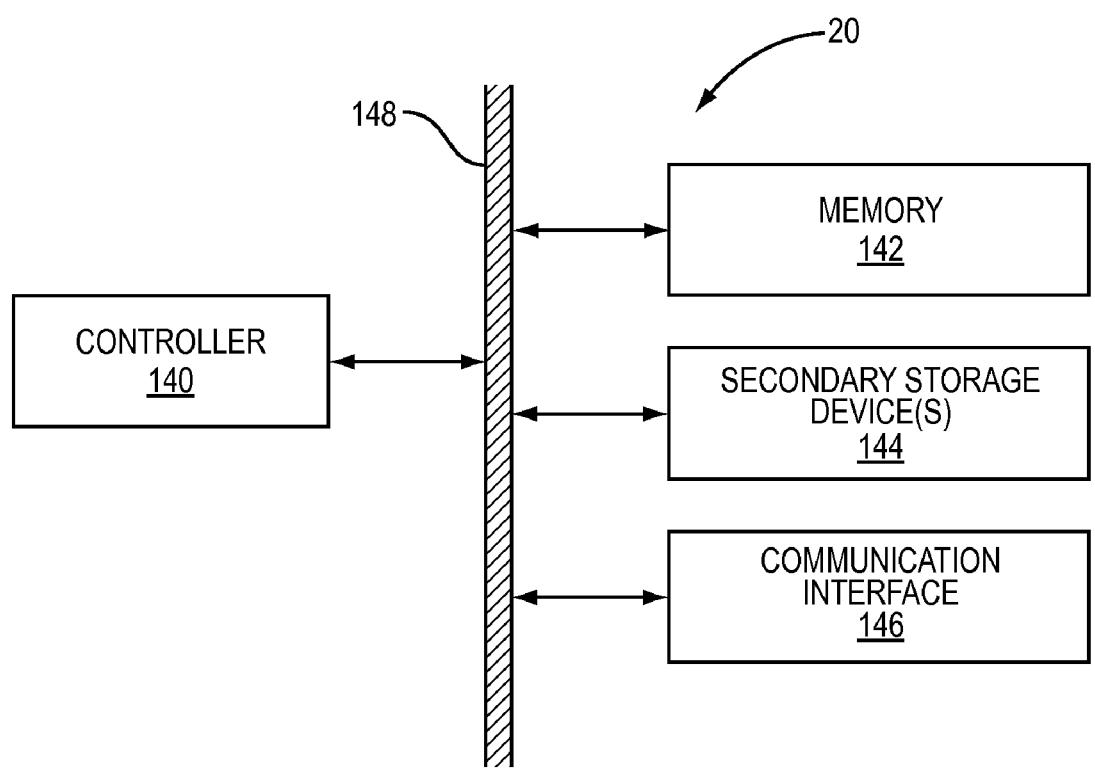
FIG. 15 is a block diagram of the crowd server of FIGS. 1A and 1B according to one embodiment of the present disclosure.

FIG. 15 is a block diagram of the crowd server 20 according to one embodiment of the present disclosure. As illustrated, the crowd server 20 includes a controller 140 connected to memory 142, one or more secondary storage devices 144, and a communication interface 146 by a bus 148 or similar mechanism. The controller 140 is a microprocessor, digital ASIC, FPGA, or the like. In this embodiment, the controller 140 is a microprocessor, and the application layer 70, the business logic layer 72, and the object mapping layer 92 (FIG. 2) are implemented in software and stored in the memory 142 for execution by the controller 140. Further, the datastore 94 (FIG. 2) may be implemented in the one or more secondary storage devices 144. The secondary storage devices 144 are digital data storage devices such as, for example, one or more hard disk drives. The communication interface 146 is a wired or wireless communication interface that communicatively couples the crowd server 20 to the network 18 (FIGS. 1A and 1B). For example, the communication interface 146 may be an Ethernet interface, local wireless interface such as a wireless interface operating according to one of the suite of IEEE 802.11 standards, or the like.

The following is an exemplary and non-limiting use case that illustrates some, but not necessarily all, of the features described above.

- Fred is getting ready to watch the NCSU vs. UNC basketball game on TV.
- Fred hates listening to the commentators because they are all biased towards UNC, which is a well-known fact among NCSU fans.
- Fred could listen to the Wolfpack channel on the radio, but the radio transmission precedes the TV transmission by 8 seconds.
- Instead, Fred decides to use the status update display function 66 of his media playback device 46 (e.g., his set-top box connected to his TV).
- Fred's playback device 46 extracts the time and location of capture for the current or upcoming segment of the video stream (i.e., the television broadcast stream), and the status update display function 66 sends a request for status updates to the crowd server 20 that includes the time and location of capture.
- The crowd server 20 identifies one or more crowds of users located in proximity to the location of capture at the time of capture of the segment that match Fred's user profile and obtains status updates sent by users 16 in the identified crowds in temporal proximity to the time of capture of the segment.
- Fred has chosen to prioritize the status updates based on the originating users in the following order: coaches, players, pro NCSU commentators, and NCSU fans.

The status updates are returned to the media playback device 46 and presented to Fred while Fred is watching the game.

The process continues such that status updates for future segments of the video stream are obtained and displayed to Fred.

Those skilled in the art will recognize improvements and modifications to the preferred embodiments of the present disclosure. All such improvements and modifications are considered within the scope of the concepts disclosed herein and the claims that follow.

What is claimed is:

1. A method of operation of a media playback device comprising:
   receiving a media content stream from a remote source of the media content stream;
   obtaining a time of capture and a location of capture of a segment of the media content stream;
   obtaining, from a status update service, one or more relevant status updates comprising one or more status updates sent in temporal proximity to the time of capture of the segment of the media content stream by users located in proximity to the location of capture of the segment of the media content stream at the time of capture of the segment of the media content stream and that have user profiles that match a user profile of a user of the media playback device to at least a predetermined threshold degree; and
   effecting presentation of the one or more relevant status updates during playback of the media content stream.

2. The method of claim 1 wherein the media content stream is encoded with the time of capture and the location of capture of the segment of the media content stream, and further wherein:
   obtaining the time of capture of the segment of the media content stream comprises extracting the time of capture of the segment of the media content stream from the media content stream; and
   obtaining the location of capture of the segment of the media content stream comprises extracting the location of capture of the segment of the media content stream from the media content stream.

3. The method of claim 1 wherein the time of capture of the segment of the media content stream is a particular point in time, and further wherein the one or more status updates are one or more status updates sent within a time window having a predetermined duration and encompassing the particular point in time by the users located in proximity to the location of capture of the segment of the media content stream at the time of capture of the segment of the media content stream.

4. The method of claim 1 wherein the time of capture of the segment of the media content stream is a particular period of time, and further wherein the one or more status updates are one or more status updates sent within the period of time by the users located in proximity to the location of capture of the segment of the media content stream at the time of capture of the segment of the media content stream.

5. The method of claim 1 wherein obtaining the one or more relevant status updates comprises obtaining the one or more relevant status updates as the media content stream is received and played by the media playback device.

6. The method of claim 1 further comprising storing the media content stream, and wherein obtaining the one or more relevant status updates comprises:
   obtaining the one or more relevant status updates as the media content stream is received; and
   storing the one or more relevant status updates for presentation during a subsequent playback of the media content stream from storage.

7. The method of claim 1 further comprising storing the media content stream, and wherein obtaining the one or more relevant status updates comprises obtaining the one or more relevant status updates during playback of the media content stream from storage.

8. The method of claim 1 wherein effecting presentation of the one or more relevant status updates during playback of the media content stream comprises effecting presentation of the one or more relevant status updates during playback of the segment of the media content stream.

9. A method of operation of a media playback device comprising:
   receiving a media content stream from a remote source of the media content stream;
   obtaining a time of capture and a location of capture of a segment of the media content stream;
   obtaining an anchor for the segment of the media content stream that identifies a location other than the location of capture of the segment of the media content stream that is relevant to the segment of the media content stream;
   obtaining, from a status update service, one or more relevant status updates comprising one or more status updates sent in temporal proximity to the time of capture of the segment of the media content stream by users located in proximity to the location of capture of the segment of the media content stream at the time of capture of the segment of the media content stream and one or more status updates sent in temporal proximity to the time of capture of the segment of the media content stream by users located in proximity to the location identified by the anchor at the time of capture of the segment of the media content stream; and
   effecting presentation of the one or more relevant status updates during playback of the media content stream.

10. A method of operation of a media playback device comprising:
   receiving a media content stream from a remote source of the media content stream;
   obtaining a time of capture and a location of capture of a segment of the media content stream;
   obtaining an anchor for the segment of the media content stream that identifies a location that is relevant to the segment of the media content stream other than the location of capture of the segment of the media content stream and an anchor time;
   obtaining, from a status update service, one or more relevant status updates comprising one or more status updates sent in temporal proximity to the time of capture of the segment of the media content stream by users located in proximity to the location of capture of the segment of the media content stream at the time of capture of the segment of the media content stream and one or more status updates sent in temporal proximity to the anchor time identified by the anchor by users in one or more crowds of users located in proximity to the location identified by the anchor at the anchor time identified by the anchor; and
   effecting presentation of the one or more relevant status updates during playback of the media content stream.

11. The method of claim 1 wherein effecting presentation of the one or more relevant status updates comprises prioritizing the one or more relevant status updates based on at least one of a group consisting of: proximity to the location of capture of the segment of the media content stream, temporal proximity to the time of capture of the segment of the media content stream, degree of similarity between the user profiles of the users that sent the one or more relevant status updates and the user profile of the user of the media playback device, update type, feedback from the user of the media playback device, maturity rating, and subject.

12. The method of claim 1 wherein:
obtaining the time of capture and the location of capture of the segment of the media content stream comprises obtaining times of capture and locations of capture for a plurality of segments of the media content stream including the segment of the media content stream;
obtaining the one or more relevant status updates comprises, for each segment of the plurality of segments of the media content stream, obtaining one or more relevant status updates comprising one or more status updates sent in temporal proximity to the location of capture of the segment of the media content stream by the users located in proximity to the location of capture of the segment of the media content stream at the time of capture of the segment of the media content stream; and
effecting presentation of the one or more relevant status updates comprises effecting presentation of the one or more relevant status updates for each of the plurality of segments of the media content stream.

13. The method of claim 12 wherein effecting presentation of the one or more relevant status updates comprises sorting the one or more relevant status updates obtained for the plurality of segments of the media content stream according to at least one of a group consisting of: the plurality of segments of the media content stream, location of capture boundaries in the media content stream, and time of capture boundaries in the media content stream.

14. The method of claim 1 wherein the one or more relevant status updates each comprise at least one of a group consisting of: textual content, audio content, image content, and video content.

15. The method of claim 1 wherein receiving the media content stream comprises receiving the media content stream via one of a group consisting of: a broadcast connection, an Internet connection, and a Local Area Network connection.

16. A media playback device comprising:
a network interface;
a broadcast reception and playback function adapted to:
receive a media content stream from a remote source of the media content stream via the network interface; and
obtain a time of capture and a location of capture of a segment of the media content stream; and
a status update display function adapted to:
obtain, from a status update service via the network interface, one or more relevant status updates comprising one or more status updates sent in temporal proximity to the time of capture of the segment of the media content stream by users located in proximity to the location of capture of the segment of the media content stream at the time of capture of the segment of the media content stream and that have user profiles that match a user profile of a user of the media playback device to at least a predetermined threshold degree; and
effect presentation of the one or more relevant status updates during playback of the segment of the media content stream.

17. A non-transitory computer-readable medium storing software for instructing a controller of a media playback device to:
receive a media content stream from a remote source of the media content stream;
obtain a time of capture and a location of capture of a segment of the media content stream;
obtain, from a status update service, one or more relevant status updates comprising one or more status updates sent in temporal proximity to the time of capture of the segment of the media content stream by users located in proximity to the location of capture of the segment of the media content stream at the time of capture of the segment of the media content stream and that have user profiles that match a user profile of a user of the media playback device to at least a predetermined threshold degree; and
effect presentation of the one or more relevant status updates during playback of the segment of the media content stream.

* * * * *